US012595350B2

(12) United States Patent
Scavello et al.

(10) Patent No.: US 12,595,350 B2
(45) Date of Patent: Apr. 7, 2026

(54) COMPOSITION OF PLASTIC MATERIAL AND PROCESS FOR TREATING PLASTIC MATERIALS FOR FORMING SAID COMPOSITION

(71) Applicants: ENI S.P.A., Rome (IT); VERSALIS S.P.A., San Donato Milanese (IT)

(72) Inventors: Francesco Scavello, Mantova (IT); Nicola Vecchini, Mantova (IT); Riccardo Felisari, San Giorgio Bigarello (IT); Armando Galeotti, Mantova (IT); Daniele Balducci, San Donato Milanese (IT); Stefania Guidetti, San Donato Milanese (IT); Erica Montanari, San Donato Milanese (IT)

(73) Assignees: ENI S.P.A., Rome (IT); VERSALIS S.P.A., San Donato Milanese (IT)

( * ) Notice: Subject to any disclaimer, the term of this patent is extended or adjusted under 35 U.S.C. 154(b) by 588 days.

(21) Appl. No.: 18/011,451

(22) PCT Filed: Jun. 16, 2021

(86) PCT No.: PCT/IB2021/055307
§ 371 (c)(1),
(2) Date: Dec. 19, 2022

(87) PCT Pub. No.: WO2021/255662
PCT Pub. Date: Dec. 23, 2021

(65) Prior Publication Data
US 2023/0265258 A1     Aug. 24, 2023

(30) Foreign Application Priority Data
Jun. 18, 2020     (IT) ......................... 102020000014629

(51) Int. Cl.
*C08J 11/16*          (2006.01)
*C08K 3/26*           (2006.01)

(52) U.S. Cl.
CPC .................. *C08J 11/16* (2013.01); *C08K 3/26* (2013.01); *C08J 2323/06* (2013.01); *C08J 2323/12* (2013.01); *C08J 2325/06* (2013.01); *C08J 2327/06* (2013.01); *C08J 2367/02* (2013.01); *C08J 2377/00* (2013.01); *C08K 2003/262* (2013.01)

(58) Field of Classification Search
USPC ....................................................... 521/40.5
See application file for complete search history.

(56) References Cited

U.S. PATENT DOCUMENTS

| 3,440,073 | A | 4/1969 | Fowler et al. |
| 3,957,620 | A | 5/1976 | Fukui et al. |
| 5,174,893 | A | 12/1992 | Halpern et al. |
| 5,795,364 | A | 8/1998 | Payne et al. |
| 6,372,807 | B1 | 4/2002 | Szekely |
| 6,897,014 | B2 | 5/2005 | Yanagi et al. |
| 2013/0274535 | A1 | 10/2013 | Csokai et al. |

FOREIGN PATENT DOCUMENTS

| CA | 2202941 | A1 | 10/1998 |
| CN | 1353005 | A | 6/2002 |
| CN | 1219581 | C | 9/2005 |
| CN | 106349500 | A | 1/2017 |
| CN | 108587668 | A | 9/2018 |
| CN | 109642164 | A | 4/2019 |
| DE | 4329433 | A1 | 3/1995 |
| EP | 1731557 | A1 | 12/2006 |
| EP | 2537883 | A1 | 12/2012 |
| JP | H10235186 | A | 9/1998 |
| JP | H10235309 | A | 9/1998 |
| JP | H1119617 | A | 1/1999 |
| JP | H1121573 | A | 1/1999 |
| JP | H11199703 | A | 7/1999 |
| JP | 2001270962 | A | 10/2001 |
| RU | 2127296 | C1 | 3/1999 |
| WO | 9708266 | A1 | 3/1997 |
| WO | 2008141830 | A1 | 11/2008 |
| WO | 2008141831 | A1 | 11/2008 |
| WO | 2011082474 | A1 | 7/2011 |
| WO | 2012076890 | A1 | 6/2012 |
| WO | 2014033733 | A1 | 3/2014 |
| WO | 2016103199 | A1 | 6/2016 |
| WO | 2018025103 | A1 | 2/2018 |
| WO | 2018078555 | A1 | 5/2018 |

OTHER PUBLICATIONS

International Search Report and Written Opinion for International Application No. PCT/IB2021/055307, International Filing Date Jun. 16, 2021, Date of Mailing Oct. 5, 2021, 9 pages.
Belikov V.G. Pharmaceutical Chemistry. Moscow, 2007, 624 p.-p. 23.
Chinese Office Action for Application No. 2021800502256, dated Dec. 30, 2024, 13 pages with translation.

(Continued)

*Primary Examiner* — Terressa Boykin
(74) *Attorney, Agent, or Firm* — CANTOR COLBURN LLP

(57)          ABSTRACT

A plastic composition includes
   a plastic material with a halogen content less than or equal to 0.5% by mass with respect to the plastic material,
   oligomers derived from the plastic contained in the plastic material,
   halogenated salts, and
   hydrocarbon. A related process for producing a composition of plastic material includes the steps of forming a composition; bringing the composition at a temperature between 150° C. and 450° C., and keeping the composition obtained in the temperature range for a time between 10 seconds and 30 minutes to form a final composition. The inerting agent is added during the process in an amount such that the ratio between the sum of the moles of the alkali metals belonging to group IA and the sum of the moles of halogen contained in the plastic material is at most 20:1.

43 Claims, 5 Drawing Sheets

(56) References Cited

OTHER PUBLICATIONS

Russian Office Action for Application No. 2023100584, dated Nov. 18, 2024, 18 pages with translation.

Vorobyova G.Ya. Corrosion resistance of materials in aggressive environments of chemical production. Moscow, "Chemistry", 1975, 2nd edition, p. 816.

Indian Office Action for Application No. 202347001974, dated Jan. 19, 2026, 12 pages.

Yoshinaga, et al., "Alkaline dechlorination of poly(vinyl chloride) in organic solventsunder mild conditions", Polymer Degradation and Stability, vol. 86, Issue 3, 2004, pp. 541-547, ISSN 0141-3910, https://doi.org/10.1016/j.polymdegradstab.2004.06.008 ; Dec. 1, 2004.

COMPOSITION OF PLASTIC MATERIAL AND PROCESS FOR TREATING PLASTIC MATERIALS FOR FORMING SAID COMPOSITION

CROSS REFERENCE TO RELATED APPLICATIONS

This application is a National Stage application of PCT/IB2021/055307, filed on Jun. 16, 2021, which claims benefit of Italian Application No. 102020000014629, filed on Jun. 18, 2020, both of which are incorporated by reference in their entirety herein.

TECHNICAL FIELD

The present disclosure falls within the field of the chemical recycling processes of plastics and has the objective of the enhancement of plastic materials otherwise destined for landfill or waste-to-energy disposal.

In particular, the present patent application relates to a composition of plastic material in which the plastic material is free from or has a reduced content of halogen and a process for its preparation, able to chemically treat plastic material and mixtures of different plastic materials, even recycled ones, containing halogenated components.

Furthermore, the present patent application relates to a process able to simultaneously treat distillation residues, in particular vacuum residues and plastic materials as defined in this text, in order to generate compositions of plastic material that are free from halogens or with a halogen content less than or equal to 0.5% by weight with respect to the plastic material, which can be subsequently enhanced through appropriate refinery processes for light hydrocarbon products such as, for example, naphtha, atmospheric gas oil (AGO), light vacuum gas oil (LVGO) and heavy vacuum gas oil (HVGO).

The main aim of the present disclosure is to reduce the halogen content of the starting plastic material, preferably chlorine, forming plastic compositions in which the plastic material is free from halogenated components or with a halogen content less than or equal to 0.5% by weight with respect to the plastic material.

BACKGROUND

The depolymerisation processes of plastics can follow a molecular or chemical type approach.

According to a molecular approach, the polymers are treated to obtain the monomers used at the outset. According to a chemical approach, instead, starting from a plastic it is possible to obtain building blocks of the petrochemical industry.

SUMMARY

The proposed solution makes it possible to insert plastic materials in the circuit of the circular economy which would otherwise be destined for landfill or waste-to-energy disposal, positively impacting the reduction of the consumption of raw materials, both of fossil origin (polymeric materials of petroleum origin) and of plant origin (bio-based polymeric materials).

In the present patent application, plastic material means a solid composition of one or more plastics, containing halogenated components and possibly further compounds of organic or inorganic origin.

In the present patent application, plastic means what is defined by the IUPAC: "polymeric material that may contain other substances aimed at improving performances or reduce costs".

Typically, a plastic is a polymeric material or a mixture of polymeric materials.

In the present patent application, PLASMIX means a mixture coming from the sorting of separate waste collection of post-consumption plastic packaging. In the sorting centres, certain polymers are selected first, in particular polyethylene, polypropylene and PET (polyethylene terephthalate). Everything that is not selected takes the name of PLASMIX.

The plasmix may be of the washed type, i.e. it has undergone a washing treatment for removing the wet part contained therein, or as such, i.e. not washed.

In the present patent application, "inerting agent" means a chemical compound able to react with the halogens present in the plastic material.

In the present patent application "halogen content in the plastic material, by mass", when measured in the composition of plastic material, means the measurement performed according to the method described below.

Two samples of the composition of plastic material are taken. In the first sample, the halogen is determined by means of ion chromatography after the mineralisation of the sample through calorimetric bomb. The second sample is treated at 550° C. for 4 hours in an inert environment (nitrogen) and at atmospheric pressure. In this second sample thus treated the halogen is determined by means of ion chromatography after mineralisation of the sample treated through calorimetric bomb. The difference in quantity of halogen between the first and the second sample is evaluated. Said difference is attributed to the organic halogen and therefore for the purpose of the present disclosure it is defined as the quantity of organic halogen. Such quantity is the "halogen content in the plastic material, by mass".

In this way, when the final composition obtained with the process described and claimed is sent to downstream refinery processes, it is observed that hydrogen halides are not found in the gases generated, in the light and heavy distillates produced. Furthermore, it is observed that alkyl or aryl halides are not present in the gases, light distillates and heavy distillates of said refinery processes.

In this way the hydrocarbon products obtained with refinery processes (subsequently described in detail) starting from the inert mixtures prepared according to the process described and claimed, are substantially free from halogens.

In the present patent application the gaseous products or gases were detected and measured through ASTM D7833 Standard Refinery Gas Analysis and are products containing 1 to 4 carbon atoms (gases), defined as GASES.

In the present patent application light distillates are defined as gaseous products containing more than 5 carbon atoms detected through ASTM D7833 Standard Refinery Gas Analysis and the liquid products whose boiling point range measured through ASTM D2887 and through ASTM D6352 is comprised between 36° C. and 170° C.

In the present patent application heavy distillates are defined as liquid products whose boiling point range measured through ASTM D2887 and through ASTM D6352 is comprised between 170° C. and 500° C.

The bottom is determined by the other products, i.e. liquid products with a boiling point greater than 500° C. (500+° C.), or of a solid nature.

The gaseous and liquid products are detected and measured through ASTM D7833 Standard Refinery Gas Analysis.

In the present patent application, slurry phase means a mixture of liquid and solid.

In the present patent application the term "solid" means the insoluble tetrahydrofuran fraction, indicated in the present text with the acronym THF-i.

In the present patent application the term "asphaltene" means the organic fraction soluble in tetrahydrofuran but insoluble in n-pentane.

Asphaltenes are classified according to their insolubility in n-paraffins (typically having 5 to 7 C5-C7 carbon atoms). Such compounds are generally constituted by nuclei of polycondensate aromatics that are variously branched and linked together through linear chains. Such compounds may contain heteroatoms (S, N) in their inside which give them their polar nature.

In the present patent application, unless specifically indicated, all the quantities are expressed by weight (mass) and the percentages are percentages by weight.

In the present patent application all the percentages by weight are calculated with respect to the total mass of the product, compound, mixture or composition described and claimed.

In the present patent application the term "substantially free from X" where "X" is a general compound or component, e.g. a halogen, means that the quantity X is absent or is less than or equal to 5 ppm with respect to the weight of the compound, composition or mixture that contains it, where ppm means the parts per million by weight.

The gaseous products obtained with the processes described in the present text were detected and measured by ASTM D7833 Standard Refinery Gas Analysis and are products containing from 1 to 4 carbon atoms (gases), defined as GASES.

The light distillates obtained with the processes described in the present text are defined as gaseous products containing more than 5 carbon atoms detected through ASTM D7833 Standard Refinery Gas Analysis and the liquid products whose boiling point variation measured through ASTM D2887 and through ASTM D6352 is comprised between 36° C. and 170° C.

The heavy distillates obtained with the processes described in the present text are defined as liquid products whose boiling point variation measured through ASTM D2887 and through ASTM D6352 is comprised between 170° C. and 500° C.

The distillation residues used in the processes described in the present text are determined by the liquid products with boiling point greater than or equal to 500° C. (500+° C.), and may also be of a solid nature.

The gaseous and liquid products obtained with the processes described in the present text are detected and measured through ASTM D7833 Standard Refinery Gas Analysis.

In the present patent application the yield is defined as the ratio between the quantity of product obtained and the quantity of product supplied in a process.

In the present patent application, "significant variations in the yield of "X" where "X" is a compound or component, means that the yield of X is not modified or is modified at the most by 10%, preferably by 5%, where the percentage means the difference between the maximum yield of X and the minimum yield of X, by mass, divided by the total material supplied to the process, still by mass.

In the present patent application, all the operating conditions reported in the text must be understood as preferred conditions even if not expressly declared.

For the purposes of the present discussion the term "to comprise" or "to include" also comprises the term "to consist in" or "essentially consisting of".

For the purposes of the present discussion the definitions of the intervals always comprise the extreme values unless otherwise specified.

WO 2008/141830 describes a process for the hydroconversion of heavy oils in which the reaction takes place in a bubble-type reactor capable of accumulating at least 50 kg/m$^3$ of solids, fuelled by hydrogen or a mixture of hydrogen and sulphuric acid in which the hydrogen has a weight ratio, with respect to the charge, of at least 0.3. The concentration of molybdenum used as a catalyst is at least kg per each m$^3$ of charge.

WO 2008/141831 describes a system for the hydroconversion of heavy oils which consists of a solids accumulation reactor and a stripping section outside or inside the reactor. When the stripping section is internal, the reactor can be completely or partially filled and the stripping section can be positioned in the upper part of the reactor or downstream of a duct inside the reactor. When the stripping section is external, the reactor—completely filled—provides a forced recirculation circuit of the liquid phase to the reactor itself. It is also possible that there is a liquid-vapour separator downstream of the reactor.

WO 2016/103199 describes a system for the hydroconversion of heavy oils comprising a reactor, a liquid-vapour separator and a stripping section of the conversion products outside the reactor. The stripping gas is introduced directly into the reaction effluent through a stripping gas injection duct, positioned at a point of the connection duct between the reactor head and the liquid-vapour separator, said connection duct being inclined, at least starting from the introduction point, upwards with a slope between 2% and 20%, with respect to a horizontal plane. The stripping gas introduction duct is inclined with respect to the axis of the connection duct between the reactor head and the liquid-vapour separator at an angle comprised between 20° and 65°. The flow of the stripping gas stream that is introduced into the connection duct between the reactor head and the separator has a direction from top to bottom. After stripping, the effluent is sent to an HP/HT phase separator to separate the liquid phase also containing a small amount of solids (those formed during the reaction and the dispersed catalyst) which is recycled into the reactor and a vapour phase containing the reaction products.

WO 2018/078555 describes a process for the hydroconversion of heavy petroleum products which are reacted in a hydroconversion reactor, together with a recycling containing hydrogenating gas and in the presence of a suitable catalyst producing a two-phase effluent.

The reaction effluent is fed to a high-pressure and high-temperature stripping step, which operates at the reaction pressure, using a stream as a stripping gas having the same composition as the gas fed to the reactor; and thus producing a stream in vapour phase and a stream in slurry phase containing the heavy products and solids. The slurry is in part recirculated into the hydroconversion section, and partly withdrawn, continuously forming a purge stream.

CN 108587668 describes a process for enhancing the waste plastic and heavy oils producing light gas oil by pyrolysis, desulphurisation and visbreaking of the heavy oil and plastic waste. The process is characterised by the use of FCC catalyst for pyrolysis, desulphurisation and visbreaking.

WO 2011/08247 describes a method for reducing the viscosity of heavy oil by visbreaking which comprises the following steps:

mixing heavy oil with at least one from among flue gases, $CO_2$ and steam for producing a mixed heavy oil;

heating the mixed heavy oil for producing heated heavy oil; and creating high pressure pulses in the heated heavy oil for breaking the heated heavy oil to produce cracked oil with a lower viscosity than the heavy oil.

WO 97/08266 describes a visbreaking process for the joint disposal of polyolefin plastic materials and the production of fuel oil. A stream is co-fed comprising between 0.01% and 5% by weight of plastic material and heavy oil into a visbreaking zone under visbreaking conditions for which the product contains an enhanced yield of gas oil fraction plus a reduced yield of carbonaceous sediment and bottom fraction.

Many processes are known in the state of the art for the pyrolysis of heavy oils, which enable the generation of lighter hydrocarbons and, generally, a solid residue. For example, U.S. Pat. No. 3,957,620 describes a process for treating heavy oils mixing them with alkali metal carbonates at a temperature of 450-650° C. so as to crack them and recover a hydrocarbon with a low sulphur content and a light hydrocarbon gas in the presence of steam or oxygen vapour. The use of some salts including sodium carbonate is also known for the treatment of asphalt materials, for particular purposes. For example, U.S. Pat. No. 3,440,073 discloses the use of sodium carbonate in asphalt materials for reducing the odour therein. Other materials suitable for the purpose comprise sodium hydroxide, sodium borate, potassium hydroxide, potassium carbonate, lithium hydroxide and barium hydroxide. Sodium carbonate in the form of an aqueous solution is particularly effective.

Finally, many processes are known for treating waste such as, for example, fuels made from non-recyclable industrial refuse (RDF) for reducing the chlorine content present. In fact, chlorine is an undesired component as burning it can generate dioxins, which are highly toxic, or hydrogen chloride, a strongly caustic gas for the mucosa and in contact with materials comprising water.

WO 2018/025103 discloses a dechlorination process of a hydrocarbon flow or of a precursor thereof (plastic waste) which comprises introducing together with the plastic having a chlorine content greater than 10 ppm, a zeolite catalyst and optionally a stripping gas to a devolatilisation extruder that reduces the chlorine content.

The zeolite can comprise a catalyst for fluid catalytic cracking (FCC), a hydrophobic zeolite, a ZSM-5 zeolite or combinations.

The devolatilisation extruder is operated at a temperature between 150° C. and 450° C.

In the degassing step the pressure can be from 10 torr to atmospheric, and the residence time is from 6 seconds to an hour.

The optional "chlorine absorber" additives can include attapulgite, activated carbon, dolomite, bentonite, iron oxide, goethite, hematite, magnetite, alumina, silicon oxide and aluminosilicates, sodium, calcium or magnesium oxide.

JP-H 1119617 A illustrates a method for removing chlorine in solid fuels (RDF), by supplying RDF and an agent for removing chlorine to an apparatus where RDF is mixed and crushed, followed by a thermal and washing treatment for removing the sodium chloride. The agent that removes the chlorine is a compound of an alkali metal, in particular hydroxide or carbonate, more in particular sodium and potassium hydroxide and carbonate.

U.S. Pat. No. 6,372,807 describes a method for converting mixed plastic waste for the thermal and mechanical treatment of said waste in the presence of a mineral oil, which comprises the grinding of said plastic waste at a temperature between 150 and 250° C. in the presence of at least 20% low density polyethylene (LDPE) with a softening point less than 150° C.

JP-H 10,235,186 A discloses a process for the dechlorination of gases, which uses a carbonate for the abatement of the chlorine present in the gas. The contact can be performed for example with a solution, a suspension, or with powder.

JP-H 10,235,309 A discloses a method for preventing the production of hydrochloric acid during the treatment of the plastic at temperature, which envisages for example the use of sodium bicarbonate which reacting with the hydrogen chloride forms sodium chloride, water and carbon dioxide, thus preventing the formation of dioxins.

JP-H 11199703 A discloses a method for treating waste plastic for almost completely removing the chlorine, which envisages heating to 250-300° C. and removing the hydrogen chloride. The plastic is then ground and treated in a second reactor, where sodium hydroxide, sodium carbonate or a mixture of the two are used as the reactive agent, at a temperature of 300-330° C., removing the remaining chlorine as sodium chloride.

JP-H 1121573° discloses a dechlorination process of RDF which envisages treatment of RDF at a temperature comprised between 200° C. and 1000° C. and contact with a dechlorinating agent such as sodium bicarbonate.

CN 1353005A and CN 1219581C describe a dechlorination method at high temperature with a solid agent such as calcium oxide or calcium hydroxide in powder or paste, or precipitated calcium carbonate. The dechlorinating agent and the process indicated enable chlorine to be removed from natural gas, naphtha, synthesis gas for the production of ammonia, and hydrogen.

JP 2001 270962 teaches a dechlorination method by mechanical action. The resin containing chlorine is ground and mixed with a hydroxide or a carbonate of an alkali metal. The dechlorinated resin is characterised in that the mixture is converted into a mixture of dechlorinated resin and a chloride of an alkali metal by applying mechanical energy, such as compression force, shear force, impact force, frictional force or the like. For example, a grinding mill can be used.

The treated mixture is washed with water so as to remove the alkali metal chloride.

Preferably, the resin containing chlorine is PVC and the alkali metal is sodium or potassium, such as sodium hydroxide, potassium hydroxide, sodium carbonate and potassium carbonate. The removal can be performed by washing with water, as during the mechanical treatment the chlorine is transferred into an inorganic powder.

The mechanical energy application time is from 15 to 3000 minutes.

WO 2014/033733 describes a method for removing the chlorides from a stream of heavy hydrocarbons, by means of steam. Such stream of heavy hydrocarbons is naphtha, diesel, light gas oil, light coker gas oil, residue from atmospheric distillation or vacuum residue.

The processes of the state of the art envisage the use of a degassing section for removing the light chlorine compounds (such as HCl) that are developed during the heating of the recycled plastic material.

Such solution has the disadvantage of having to envisage a system for treating the highly corrosive and toxic gaseous effluents, which are generally expensive.

In other processes, the use of metal based salts is proposed, for the purpose of reacting with the hydrogen chloride produced by the decomposition of the polyvinyl chloride (PVC) contained in the recycled plastic material. However, such salts are generally unstable, especially in the processes in which water is present also in traces and high temperatures (e.g. greater than 300° C.), typically necessary for treating heavy hydrocarbon streams.

In fact, the hydrocarbon streams that are generated in the process in the gaseous state (and that cannot therefore contain solid salts) still contain chlorine (mainly as hydrogen chloride) even if the metal salt added at the inlet of the process is in excess with respect to the chlorine contained.

The presence of hydrogen chloride in said hydrocarbon streams is undesired as it forces the use of metal alloys resistant to acidity which are expensive, to limit the formation of organic chlorine in the subsequent processes or because the hydrocarbon product intended for sale has strict limits on the residual acidity and/or development of dioxins when the hydrocarbon is burned.

It is also desirable to enhance the distillation residues in oil plants, producing light hydrocarbon mixtures, which have higher added value with respect to distillation residues.

The plastic material, including a recycled one, can further contain salts and oxides of metals belonging to the alkaline earth metal group such as for example calcium carbonate. The possible presence of these in general does not constitute a problem for the processes indicated in the prior art; in fact, as indicated in some patent applications cited in the prior art, it may be added on purpose to remove or prevent the formation of chlorine.

The presence of these compounds is however undesirable in treatment processes of distillation residues, as unless they are removed they remain in the light distillates. This is true in particular for chlorine. Furthermore, in processes according to the prior art recycled plastic materials that comprise calcium, mainly in the form of salts, are not treated.

The applicant has discovered that if plastic materials, including recycled ones, are not treated appropriately, according to the teachings of the present disclosure, the release of halogens is observed in the downstream refinery processes and in particular chlorine as hydrochloric acid. The applicant has prepared a composition of plastic material mixed with hydrocarbons, oligomers derived from said plastic material, and halogenated salts, whose characteristics, through refinery processes, enable plastic materials, including recycled ones, to be enhanced, to high added value hydrocarbons such as, for example, naphtha, atmospheric gas oil (AGO), light vacuum gas oil (LGVO) and heavy gas oil (HVGO).

Therefore, the subject matter of the present patent application is a composition of plastic material which comprises:
    plastic material free from halogenated components or with a halogen content less than or equal to 0.5% by mass with respect to the plastic material,
    oligomers derived from the plastic contained in said plastic material,
    halogenated salts,
    hydrocarbons.

Furthermore, the applicant has found a process that is able to treat plastic materials, including recycled ones, containing halogenated components, from which it is possible to obtain compositions of plastic material mixed with hydrocarbons, oligomers derived from said plastic material, and halogenated salts, preferably the compositions described and claimed in the present patent application.

Further subject matter of the present patent application is also a process for producing a composition of plastic material mixed with hydrocarbons, oligomers derived from said plastic material, and halogenated salts, capable of treating plastic materials or mixtures of plastic materials, including recycled ones, containing halogenated components, which includes the following step:
    heating and mixing at the same time or in separate stages, in one or more devices which include devices for heating and mixing, a plastic material, including a recycled one, containing halogenated components, an inerting agent and a hydrocarbon stream, thus forming a composition, bringing said composition at a temperature comprised between 150° C. and 450° C. and keeping the composition thus obtained within said temperature range for a time comprised between 10 seconds and 30 minutes, thus forming a final composition;
    said process being characterized in that the inerting agent is added during the process in such an amount that the ratio between the sum of the moles of the alkali metals belonging to group IA and the sum of the moles of halogen contained in the plastic material is at most 20:1.

According to a preferred mode, in the process described and claimed the inerting agent is added in an amount such that simultaneously:
    the ratio between the sum of the moles of the alkali metals belonging to group IA and the sum of the moles of halogen contained in the plastic material is at most 20:1, preferably it varies between 10:1 and 1:1, even more preferably it varies between 3:1 and 3:2; and
    the ratio between the mass of alkali metals belonging to group IA and the mass of plastic material is at least 1:1000, preferably between 1:500 and 1:10, even more preferably between 1:100 and 5:100.

Further subject matter of the present patent application is a composition of plastic material mixed with hydrocarbons, oligomers derived from said plastic material, and halogenated salts which comprises:
    plastic material free from halogenated components or with a halogen content less than or equal to 0.5% by mass with respect to the plastic material,
    oligomers derived from the plastic contained in said plastic material,
    halogenated salts,
    hydrocarbons.
    wherein said composition can be obtained with a process capable of treating plastic materials or mixtures of plastic materials, including recycled ones, containing halogenated components, which includes the following step:
    heating and mixing at the same time or in separate stages, in one or more devices which include devices for heating and mixing, a plastic material, including a recycled one, containing halogenated components, an inerting agent and a hydrocarbon stream, thus forming a composition, bringing said composition at a temperature comprised between 150° C. and 450° C. and keeping the composition thus obtained within said temperature range for a time comprised between 10 seconds and 30 minutes, thus forming a final composition;
    said process being characterized in that the inerting agent is added during the process in such an amount that the ratio between the sum of the moles of the alkali metals belonging to group IA and the sum of the moles of halogen contained in the plastic material is at most 20:1.

The final compositions obtained with the process described and claimed can be subsequently treated in refinery processes for producing hydrocarbon products, preferably light distillates, heavy distillates and gases; more preferably selected from naphtha, atmospheric gas oil (AGO), light vacuum gas oil (LGVO) and heavy gas oil (HVGO).

A further embodiment according to the present disclosure is the process described and claimed for treating plastic materials or mixtures of plastic materials, including recycled ones, containing halogenated components, which also comprises the step of converting the final compositions of plastic material through refinery processes.

A further embodiment according to the present disclosure is the process described and claimed for treating plastic materials or mixtures of plastic materials, including recycled ones, containing halogenated components, which also comprises the step of converting through thermal or catalytic conversion processes, optionally in the presence of inerting agents, the final compositions of plastic material into hydrocarbon products, preferably light distillates, heavy distillates and gases; more preferably into products selected from naphtha, atmospheric gas oil (AGO), light vacuum gas oil (LGVO) and heavy gas oil (HVGO).

A further embodiment according to the present disclosure is the process described and claimed for treating plastic materials or mixtures of plastic materials, including recycled ones, containing halogenated components, which also comprises the step of converting through visbreaking processes, optionally in the presence of inerting agents, the final compositions of plastic material into hydrocarbon products, preferably light distillates, heavy distillates and gases; more preferably into products selected from naphtha, atmospheric gas oil (AGO), light vacuum gas oil (LGVO) and heavy gas oil (HVGO).

A further embodiment according to the present disclosure is the process described and claimed for treating plastic materials or mixtures of plastic materials, including recycled ones, containing halogenated components, which also comprises the step of converting through cracking or hydrocracking processes, optionally in the presence of inerting agents, said final compositions of plastic material into hydrocarbon products, preferably light distillates, heavy distillates and gases; more preferably into products selected from naphtha, atmospheric gas oil (AGO), light vacuum gas oil (LGVO) and heavy gas oil (HVGO).

A further embodiment according to the present disclosure is the process described and claimed for treating plastic materials or mixtures of plastic materials, including recycled ones, containing halogenated components, which also comprises the step of converting through catalytic and non-catalytic hydroconversion processes, optionally in the presence of inerting agents, said inert final mixtures into hydrocarbon products, preferably light distillates, heavy distillates and gases; more preferably into products selected from naphtha, atmospheric gas oil (AGO), light vacuum gas oil (LGVO) and heavy gas oil (HVGO).

A further embodiment according to the present disclosure is the process described and claimed for treating plastic materials or mixtures of plastic materials, including recycled ones, containing halogenated components, which also comprises the step of converting through catalytic hydroconversion processes with Eni Slurry Technology (EST), optionally in the presence of inerting agents, said final compositions of plastic material into hydrocarbon products, preferably light distillates, heavy distillates and gases; more preferably into products selected from naphtha, atmospheric gas oil (AGO), light vacuum gas oil (LGVO) and heavy gas oil (HVGO).

A first advantage of the present disclosure is the provision of a process for treating plastic material, preferably recycled plastic material, and hydrocarbons that is simple and resilient with respect to the composition of plastic material to be recycled. A resilient process means that the variation in composition within the aforesaid limits does not cause any significant variations to the yield of light distillates.

A second advantage of the present disclosure is the provision of a process for treating plastic material that does not generate hydrohalic acids even when the quantity of halogens comprised in the plastic material is high, i.e. up to 10% by weight, preferably up to 6% by weight. In fact, the inerting agent is able to react with the halogenated components present in the plastic material. In this way, when the plastic material treated with the inerting agent is sent to refinery processes downstream of the process described and claimed, it is observed that the light and heavy distillates and the gases produced do not contain hydrogen halides. It is also observed that alkyl or aryl halides are not present in said products obtained with refinery processes.

A third advantage of the present disclosure is the provision of a process for treating plastic material able to generate gaseous streams at the outlet that are substantially free from halogens, even when the quantity of halogens comprised in the plastic material to be recycled is high, i.e. up to 10% by weight, preferably up to 6% by weight.

A fourth advantage of the present disclosure is the provision of a process for treating plastic material able to generate light hydrocarbon mixtures that are substantially free from halogens, even when the quantity of halogens comprised in the plastic material to be recycled is high, i.e. up to 10% by weight, preferably up to 6% by weight.

A fifth advantage of the present disclosure is the provision of a process for treating plastic material that does not require the use of catalysts in the pre-treatment step.

A further advantage of the present disclosure is the identification of inerting agents to be used in the processes for recycling plastic material.

BRIEF DESCRIPTION OF THE DRAWINGS

Further advantages of the present disclosure will appear more clearly from the following description and from the accompanying figures, given purely by way of a non-limiting example, which represent preferred embodiments of the present disclosure.

In FIG. 1 said sections (4) and (5) are fluid-dynamically connected to one another. With reference to FIG. 1, (1) is the feeding of the vacuum residue; (2) is the feeding of the plastic material, including a recycled one; (3) is the feeding of the inerting agent.

Section (4) is the first section of the extrusion device, where the plastic material, including a recycled one (2) is melted and mixed with an inerting agent (3); in this section the dehalogenation is partial. Section (5) is the second section of the extrusion device, where the vacuum reside is supplied; in this section the plastic material at least partially dehalogenated is mixed with a vacuum residue and the composition thus obtained can be subjected to a further possible degradation.

Figure 2:
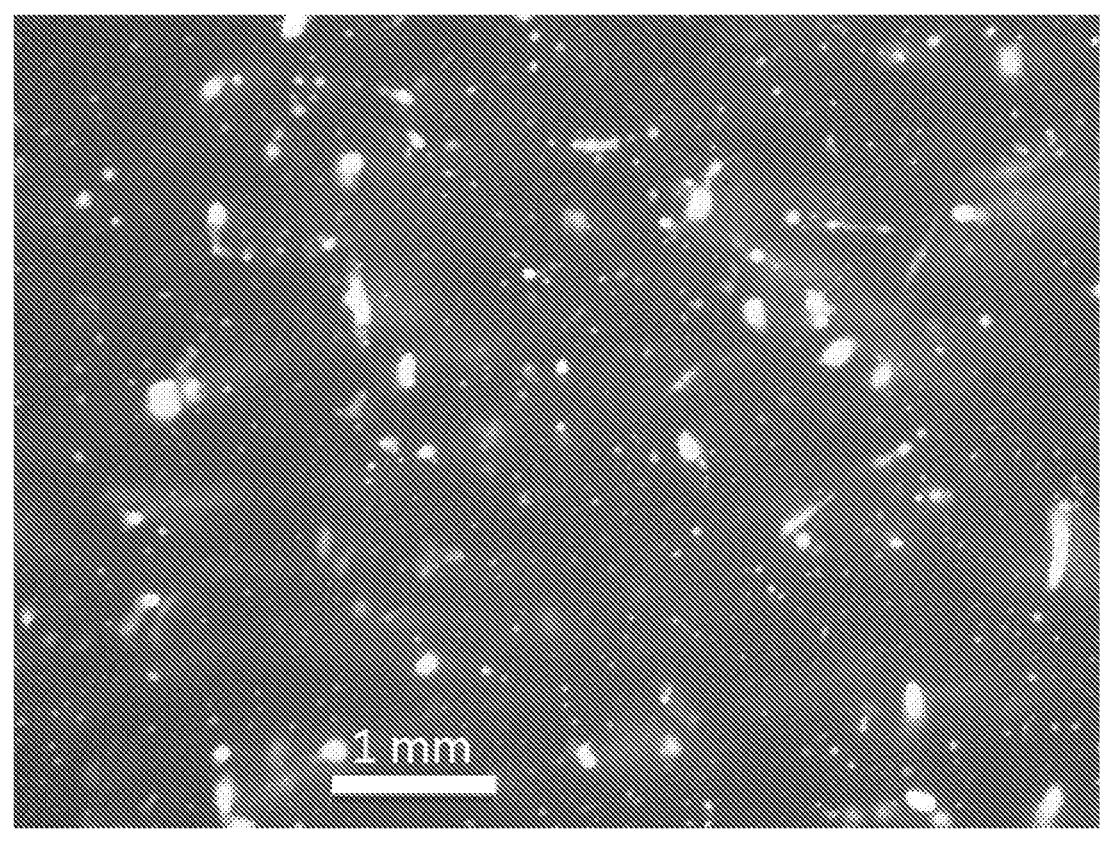

FIG. 2 represents a fluorescent micrograph on the sample of the comparative Example 1.

Figure 3:
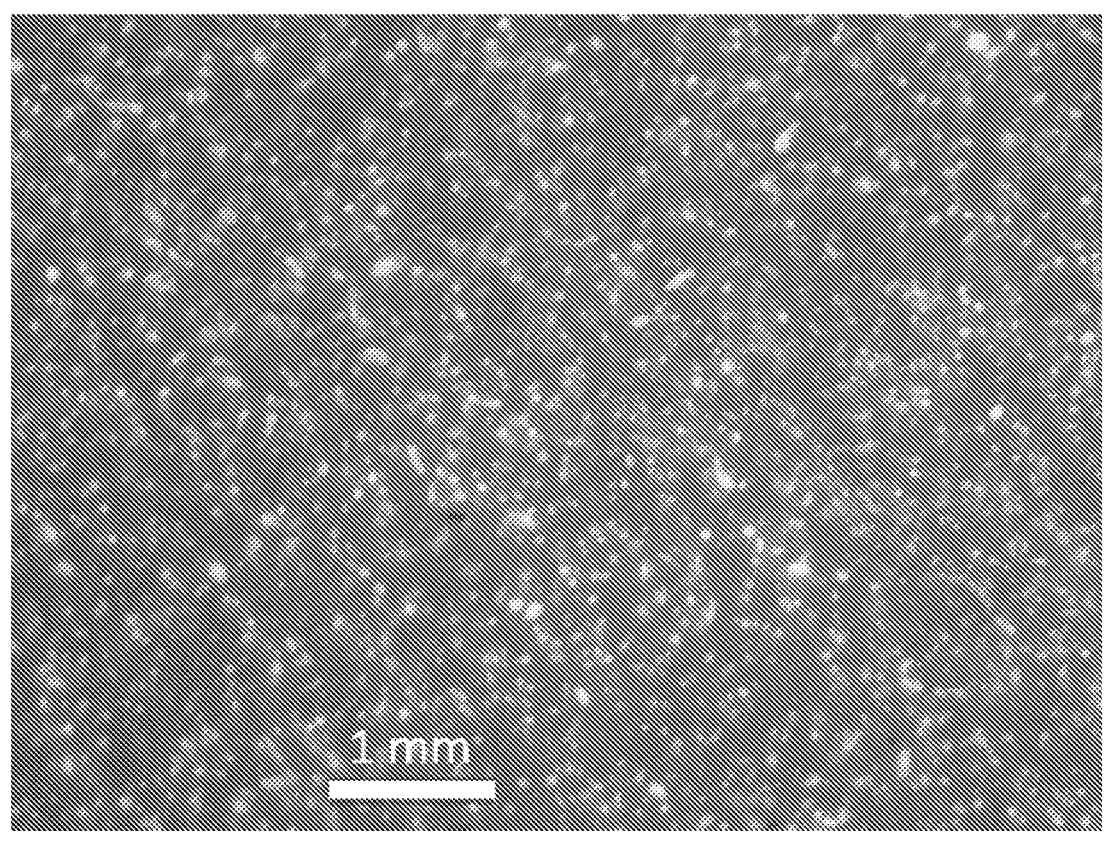

FIG. 3 represents a fluorescent micrograph on the sample of Example 3 (example according to the disclosure) at the outlet of the extruder.

Figure 4:
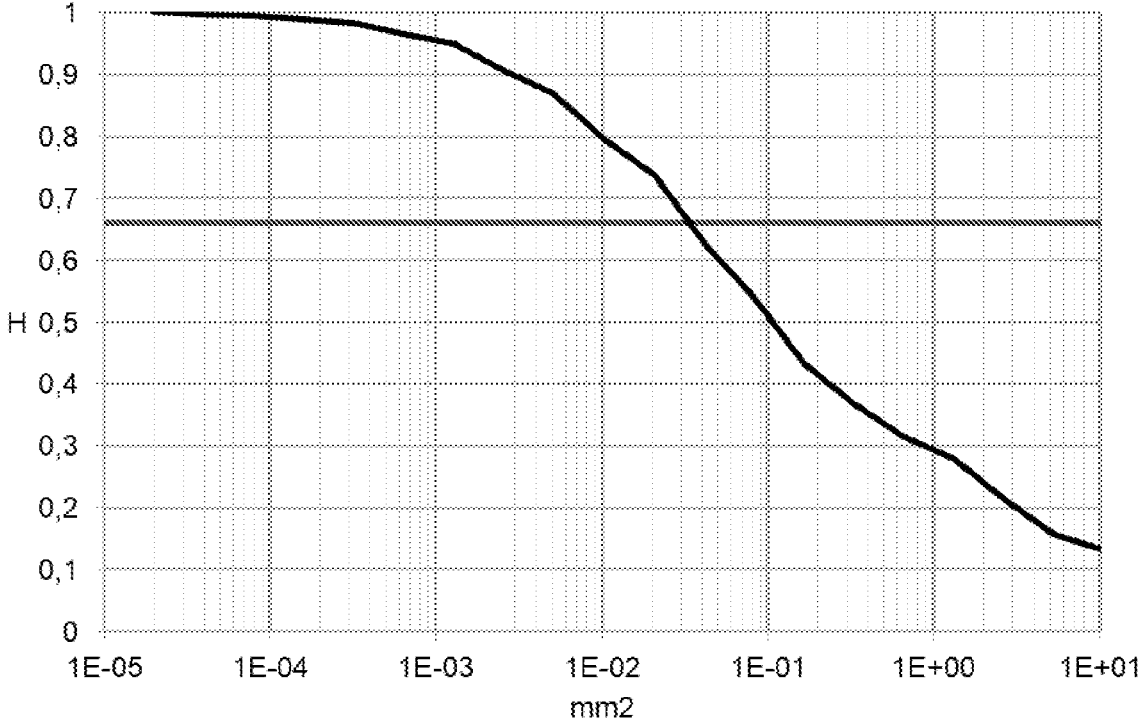

FIG. 4 represents the image analysis on the micrograph of FIG. 2 to evaluate the minimal mixing area; this figure presents the analysis of the normalised coefficient of variation (H) as a function of the mixing area, for the product of Comparative Example 1 (image analysis of FIG. 2).

Figure 5:
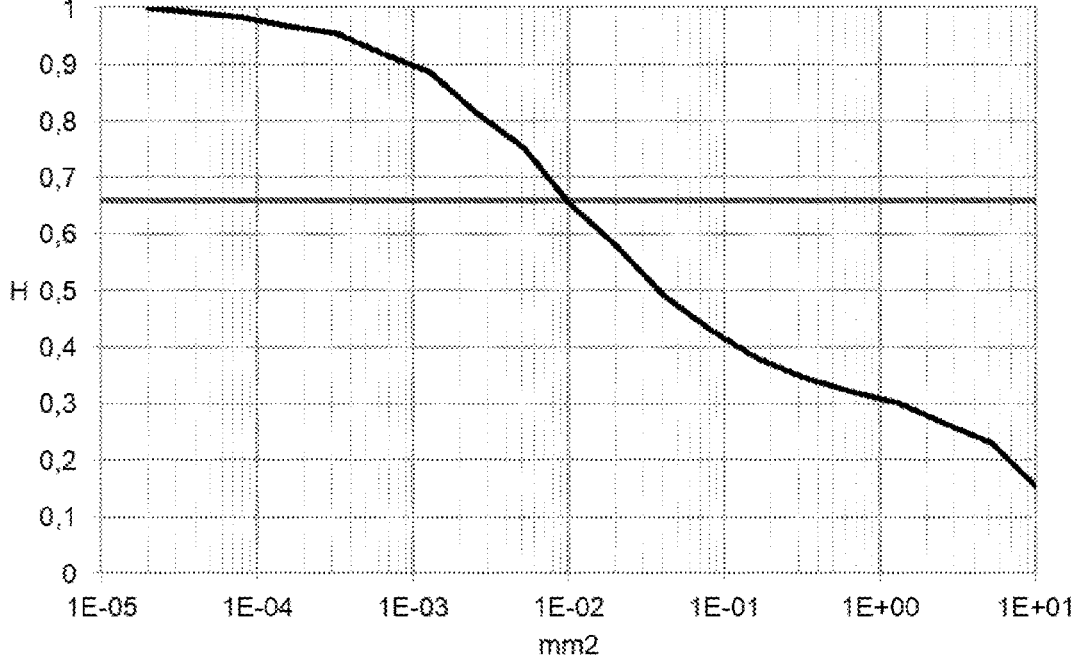

FIG. 5 represents the image analysis on the micrograph of FIG. 3 to evaluate the minimal mixing area; this figure presents the analysis of the normalised coefficient of variation (H) as a function of the mixing area, for the product at the outlet from the extruder of Example 3 (image analysis of FIG. 3).

DETAILED DESCRIPTION OF THE DRAWINGS

All the embodiments of the present disclosure are now described in detail also with reference to FIGS. 1-5.

A first embodiment of the present disclosure is a composition of plastic material mixed with hydrocarbons, oligomers derived from said plastic material, and halogenated salts. Said composition comprises:

plastic material free from halogenated components or with a halogen content less than or equal to 0.5% by mass with respect to the plastic material, oligomers derived from the plastic contained in said plastic material, halogenated salts, hydrocarbon.

The halogenated salts can be selected from alkali metal salts of group IA; preferably selected from chlorides of alkali metals of group IA, fluorides of alkali metals of group IA, bromides of alkali metals of group IA, iodides of alkali metals of group IA. More preferably, the halogenated salts are chlorides of alkali metals of group IA. Even more preferred are halogenated salts selected from lithium chloride, sodium chloride, potassium chloride, lithium bromide, sodium bromide, potassium bromide.

Among the hydrocarbons, the preferred ones are heavy distillates, or vacuum residue.

The oligomers derived from said plastic material can be considered according to the IUPAC Gold Book definition. Preferably, said oligomers have a molecular weight comprised between 100 and 10 KDa. Preferably, the oligomers derived from said plastic material have a mass at least 3 times higher than the quantity by mass of oligomers already present as impurities in the plastics of which the plastic material is composed.

The oligomers derived from said plastic material are the oligomers generated from the thermal degradation of said plastic material.

As mentioned, a plastic material comprises any composition of one or more plastics, virgin or recycled.

A virgin plastic can for example be an off-grade or second choice plastic or undesired for another reason, partially or totally.

A recycled plastic can for example be a plastic refuse or a plastic that comes from waste, through a recycling process.

A plastic material is said to be recycled when it comprises also recycled plastic.

As mentioned, as well as plastics, said plastic material can contain organic or inorganic compounds; such as, for example, metal materials, ceramic materials, construction materials, including wood, bricks, cement; insulation materials such as glass wool and rock wool; paper and card; food residues; materials from soil such as clay, stones and compost. Plastics can also comprise expanded, semi-expanded or expandable foams.

Preferably, said plastic material comprises plastics for at least 60% by weight, even more preferably at least 80% by weight, even more preferably at least 90% by weight, and in particular 100% by weight, said percentages calculated with respect to the total weight of the plastic material.

Preferably, said recycled plastic material is PLASMIX.

According to a preferred mode, the recycled plastic material is in the form of flakes and has a median size ($D_{50}$) greater than 0.2 cm (i.e. 50% of the material is withheld in a filter with perpendicular meshes, having a mesh of 0.2 cm). More preferably it has a median size ($D_{50}$) greater than 0.2 cm.

Preferably, the recycled plastic material in the form of flakes is characterised by an apparent density greater than 50 $kg/m^3$ measured according to ASTM $D_{1895}$-17 (method C, "before loading" density measurement), preferably greater than 100 $kg/m^3$.

According to another preferred mode, the recycled plastic material is compacted in the form of pellets obtained by the extrusion of flakes through a die plate with holes of diameter from 2 to 20 mm, preferably from 3 to 8 mm.

Preferably, the recycled plastic material in the form of pellets is characterised by an apparent density greater than 200 $kg/m^3$ measured according to ASTM D1895-17 (method B), even more preferably greater than 300 $kg/m^3$.

The composition of plastics contained in said plastic material preferably comprises at least one from the following components selected among, where the percentages are expressed by weight with respect to the total of the plastics (unless otherwise indicated):

Polyethylene: 10-100%

Polypropylene: 0-50%

Polystyrene: 0-50%

Polyesters: 0-20%

The sum of cellulosic, urethane and polyamide polymers: 0-20%

Inorganic fillers, such as, for example, talc and calcium carbonate: 0-30%

Chlorinated polymers in such an amount that the weight (mass) of chlorine is comprised between 0.05 and 15% with respect to the total weight (mass) of the plastic materials contained in said recycled plastic material, even more preferably comprised between 0.1 and 10%, even more preferably comprised between 0.3 and 8%, and even more preferably comprised between 1.5 and 6%.

Halogenated components are present in the plastic mixtures in amounts no greater than 10%, preferably no greater than 6%, even more preferably from 0.2% to 5% as mass of halogen atoms with respect to the mass of plastic material.

The halogenated component may be the halogen itself, or organic molecules containing halogens, or inorganic molecules containing halogens. Examples of organic molecules are polymers, in particular polyvinyl chloride or chloroprene; or hexabromocyclododecane; or decabromodiphenyl oxide. Examples of inorganic molecules are magnesium chloride or titanium chloride.

Halogens present as such or contained in said molecules may be chlorine, fluorine, bromine, iodine. Various halogenated components may be present simultaneously, e.g. among those mentioned in the present patent application, there may be a combination of hexabromocyclododecane, decabromodiphenyl oxide and polyvinyl chloride.

In the plastic mixtures other compounds of organic or inorganic origin may also be present, having for example the function of antioxidants, thermal stabilizers, antiacids, nucleating agents, UV stabilizers, antiblocking, slip agents, antislip agents, plasticisers, external lubricants, release agents, flame retardants, polymer processing aids, dyes (organic and inorganic), antistatic agents, crosslinking agents, crosslinking coadjuvants, extender oils, vulcanisation accelerants, antiozonants and mixtures thereof.

In the plastic mixtures, other organic and inorganic additives containing bromine may also be present, which are generally used to impart flame retardant properties to the plastics, in such an amount that the content by weight in bromine is up to 5% with respect to the total plastics contained in said recycled plastic material, preferably between 0.01 and 3%, even more preferably between 0.2 and 2%.

Polyethylene means polymers or copolymers of ethylene, mixtures thereof; preferably selected from high density polyethylene (HDPE), low density polyethylene (LDPE), linear low density polyethylene (LLDPE), very low density polyethylene (VLDPE), ultra low density polyethylene (ULDPE), metallocene catalysis polyethylene (m-PE), ethylene-vinyl acetate polymers (EVA) and mixtures thereof.

Polypropylene means polymers or copolymers of propylene, mixtures thereof; preferably selected from polypropylene (PP) or ethylene propylene diene monomer (EPDM) rubbers and mixtures thereof.

Polystyrene means polymers or copolymers of styrene, mixtures thereof; preferably selected from polystyrene (PS), expandable polystyrene (EPS), high impact polystyrene (HIPS), acrylonitrile butadiene styrene (ABS), styrene acrylonitrile copolymers (SAN), acrylonitrile ethylene styrene (AES), styrene (methyl) methacrylate (SMMA) copolymers, styrene-butadiene-styrene (SBS) block copolymer, styrene-ethylene-butylene-styrene (SEBS) block copolymers and mixtures thereof, and mixtures with polycarbonate (PC) PC/HIPS and PC/ABS.

Chlorinated polymers means polymers or copolymers of vinyl chloride or copolymers of vinylidene dichloride, mixtures thereof, preferably selected from polyvinyl chloride (PVC), polyvinylidene dichloride (PVDC) and copolymers thereof and mixtures thereof.

Polyesters means polycarbonate (PC), polyethylene terephthalate (PET), polytrimethylene terephthalate (PTT), polybutylene terephthalate (PBT), poly lactic acid (PLA), poly (L-lactic acid) (PLLA), 5 poly (D-lactic acid) (PDLA), poly (D,L-lactic acid) (PDLLA), polyhydroxyalkanoate (PHA) and mixtures thereof.

Polyamides means polymers characterised by the amide group CO—NH, synthesised through polymerisation by condensation of a dicarboxylic acid and a diamine, or through ring-opening polymerisation of a lactam. The polyamides are preferably nylon 6 (PA6), nylon 66 (PA66), nylon 46 (PA46), nylon 12 (PA12).

The urethane polymers are preferably selected from polyurethanes (PU) containing aliphatic, or aromatic, or ester, or ether or ureic groups and mixtures thereof.

Cellulose polymers means polymers derived from cellulose, preferably selected from cellulose nitrate, cellulose acetate, cellulose acetate butyrate, cellulose propionate, ethyl cellulose, carboxymethyl cellulose, hydroxyethyl cellulose, benzyl cellulose and regenerated cellulose and mixtures thereof.

In the process according to the present disclosure, the plastic materials, including recycled ones, containing halogenated components, an inerting agent and a hydrocarbon stream, are heated and mixed at the same time or in separate stages, in one or more apparatuses that include devices for heating and mixing, thus forming a composition. This composition is brought to a temperature comprised between 150° C. and 450° C. and kept within said temperature range for a time comprised between 10 seconds and 30 minutes, thus forming a final composition.

The inerting agent must be added in such an amount that the ratio between the sum of the moles of alkali metals belonging to group IA and the sum of the moles of halogen contained in the plastic material is maximum 20:1, preferably it varies between 10:1 and 1:1, even more preferably it varies between 3:1 and 3:2.

According to a preferred mode, the inerting agent can be added in an amount such that simultaneously:

the ratio between the sum of the moles of the alkali metals belonging to group IA and the sum of the moles of halogen contained in the plastic material is at most 20:1, preferably it varies between 10:1 and 1:1, even more preferably it varies between 3:1 and 3:2; and the ratio between the mass of alkali metals belonging to group IA and the mass of plastic material is at least 1:1000, preferably between 1:500 and 1:10, even more preferably between 1:100 and 5:100.

Preferably, the final compositions thus obtained are those described and claimed in the present patent application.

The inerting agent may be in elementary form, typically metallic, or an organic or inorganic chemical compound.

The inerting agent in elementary form may be an alkali metal, belonging to group IA of the periodic table, period from 2 (lithium) to 6 (caesium), i.e. selected from lithium, sodium, potassium, rubidium caesium, more preferably a metal selected from lithium, sodium, potassium; even more preferably a metal selected from lithium or sodium; and related combinations. Among the combinations the preferred one is the combination of metallic lithium and sodium. More preferably, the inerting agent is metallic lithium. More preferably, the inerting agent is metallic sodium. More preferably, the inerting agent is a composition of sodium and lithium. In a preferred form the inerting agent is a sodium compound. Among the sodium compounds carbonate, bicarbonate, carboxylates, biphenyl, cyclopentadiene, butyl, butyryl, oxide, hydroxide, alkyl sulfonates and alkylbenzene sulfonates are preferred. Among sodium carboxylate compounds, the preferred ones are stearates, palmitates, pivalates and octoates. Among the sodium stearates sodium 12-hydroxystearate is preferred. Among the lithium compounds, methyl, butyl, aspartate, acetate, carbonate, bicarbonate, stearate, oxide and hydroxide are preferred. Among the lithium stearates lithium 12-hydroxystearate is preferred. Anhydrifying inerting agents are preferred, i.e. materials that have the capacity to react with water, forming chemical species that no longer comprise water such as, for example, elementary lithium, elementary sodium, sodium biphenyl, sodium cyclopentadienyl.

According to a preferred mode of the disclosure, the preferred sodium compounds are carbonates and carboxylates.

Advantageously, the inerting agent can also comprise ketals, in particular 2,2-dimethoxypropane, up to 10% by weight with respect to the total weight of the inerting agent.

The preferred hydrocarbons include heavy distillates, distillation residues, vacuum residue.

Vacuum residue is a mixture of heavy hydrocarbons, characterised by a number of carbon atoms greater than or equal to 15, and by a boiling point of at least 300° C. The vacuum residue is the residual stream of a distillation column of industrial origin that remains following the vacuum distillation of a crude oil. Vacuum residue is characterised by an asphaltene content, measured with standard ASTM D6560 or equivalent, equal to at least 3%, more preferably comprised between 4% and 50%, even more preferably comprised between 5% and 25%. Asphaltenes have an aromatic content measured through ASTM D2007 or equivalent, equal to at least 3%, preferably comprised between 4% and 60%, more preferably comprised between 5% and 45%. Asphaltenes have a boiling point distribution of the different compounds (ASTM D7169 or equivalent) constituting the vacuum residue characterised by a maximum quantity of 25% with boiling point less than 500° C., preferably comprised between 1% and 20%; and maximum 35% with boiling point less than 530° C., preferably comprised between 1% and 30%.

Preferably, the quantity by mass of plastic material with respect to the quantity by mass of hydrocarbon or with respect to the quantity by mass of vacuum residue, varies between 2% and 300%; more preferably it varies between 5% and 100%, even more preferably between 10% and 70%, even more preferably between 30 and 60%.

In a preferred form the process described and claimed is performed by extrusion, heating and mixing the plastic material at the same time or in separate stages, the inerting agent and the hydrocarbon.

As mentioned, the process described and claimed can be performed in one or more apparatuses that include devices for heating and mixing.

Preferably, said apparatus can be selected from static mixers, dynamic mixers, mixing vessels, mixing systems integrated into a heating apparatus, extruders, single-screw extruders, twin-screw extruders, twin-screw co-rotating extruders, banbury mixers, BUSS mixing extruders.

Examples of static mixers, dynamic mixers and mixing vessels are described below.

According to a preferred mode of the disclosure, in the extruders it is possible to combine with the rotary motion of the screws also an alternating piston type motion, in the fluid motion direction, so as to make the mixing more efficient. In the case of extruders, kneading or geared mixing elements can also be used, or even screw elements that remain floating with respect to the rotating body of the screw.

In a preferred mode the process described and claimed takes place in a single stage. In this way plastic material, inerting agent and hydrocarbon are supplied directly to one or more apparatuses which include heating and mixing devices.

According to a preferred two-stage mode the process described and claimed comprises:

a first stage in which the plastic material and inerting agent are mixed forming a first composition which is only subsequently supplied to one or more apparatuses including mixing and heating devices, where said mixture is heated; and a second stage in which said first composition is mixed with a hydrocarbon stream, forming a final composition of plastic material.

Also according to this two-stage mode, this composition is brought to a temperature comprised between 150° C. and 450° C. and kept within said temperature range for a time comprised between 10 seconds and 30 minutes, thus forming a final composition.

Also according to this two-stage mode, the inerting agent must be added in such an amount that the ratio between the sum of the moles of alkali metals belonging to group IA and the sum of the moles of halogen contained in the plastic material is maximum 20:1, preferably it varies between 10:1 and 1:1, even more preferably it varies between 3:1 and 3:2.

Also in this two-stage mode all the preferred conditions indicated in the present patent application are valid.

In the two-stage mode, the apparatuses can be different or identical, among all those already listed in the present patent application, which are therefore preferred technical solutions.

In the preferred two-stage mode, the plastic material can preferably be pre-heated to a temperature of at least 150° C.; preferably said temperature is comprised between 170° C. and 280° C., even more preferably between 180° C. and 240° C. Preferably, said temperature is such that the polymer is brought into the molten state.

In the process described and claimed, the heating of plastic material, inerting agent and hydrocarbon stream can preferably reach a temperature comprised between 220° C. and 450° C., more preferably between 300° C. and 430° C., even more preferably between 350° C. and 420° C.

The heating and pre-heating can be performed using suitable direct or indirect heat exchange devices, known in the state of the art.

The composition thus prepared may be at a greater pressure than atmospheric pressure, preferably comprised between 1 and 200 bara, even more preferably between 5 and 100 bara. In the preferred two-stage mode of the process described and claimed, the addition of the hydrocarbon stream can be performed at a pressure greater than atmospheric pressure, preferably comprised between 1 bara and 50 bara, even more preferably between 2 bara and 20 bara.

In the process described and claimed the heating is controlled, i.e. the temperature of the composition is monitored and the supply of heat is regulated so that the temperature of the composition and/or of the apparatus in which said composition flows remains in the predetermined temperature range for the predefined time indicated.

Said predefined time is comprised between 10 seconds and 30 minutes, preferably between 15 and 600 seconds, even more preferably between 25 and 250 seconds.

In the two-stage mode, said predetermined time means the total time for performing the two stages.

Advantageously, the process described and claimed can be performed in a single apparatus, or in two or more separate apparatuses.

Preferably, in the two-stage mode said apparatus is an extruder.

The extruders previously indicated are all suitable for this preferred embodiment.

The feeding of plastic material, inerting agents and hydrocarbon streams to the apparatuses described in the present patent application can be performed with any device known in the state of the art. Furthermore, the plastic material, the inerting agent and the hydrocarbon streams can also be supplied separately to said apparatuses.

Devices suitable for the preparation of inerting agents, plastic materials and hydrocarbon streams can be selected from mixing vessels, which see to the rough mixing thereof; or systems able to prepare a fine mixture of said components such as, for example dynamic mixers (i.e. that have a fixed part and one in rotary or oscillatory movement), static mixers (where it is the passing motion of the components that when interacting with the geometry of the mixer induces the mixing thereof). Among the dynamic mixers, turbo-mixers are the preferred ones. Combinations of static and dynamic mixers can be used. For example, the use of retracted open impeller pumps, which enable the suction of liquids also containing solids of large dimensions, combined with mixing heads (see for example Silverson Verso Vessel Package mixer). Among the static mixers, SMX, SMXL mixers and derivatives can for example be used. Preferred static mixers are those that offer a very large passage upon the passing of fluid, useful in the event of the presence of solid bodies (to prevent obstructions). Among these the Statiflo DSM can be mentioned. Among the dynamic agitators, marine propellers, propellers, airfoils, ribbon mixers and anchors can for example be used.

To evaluate the quality of the mixing in the process described and claimed, as well as performing micrographs of samples of inert mixtures leaving the mixing device and qualitatively evaluating the degree of mixing, a quantity evaluation was performed through the analysis of the coefficient of variation (CoV) of the plastic material in the inert mixture at the exit, through the numerical analysis of said micrographs, with the methodology that is now illustrated.

The coefficient of variation (CoV) is a dimensionless ratio that results from the division of the standard deviation of a measured quantity with respect to its average:

$$CoV = 1\bar{x} \cdot \sqrt{\frac{\sum_{i=1}^{N}(x_i - \bar{x})^2}{N-1}}$$

$$\bar{x} = \frac{1}{N} \cdot \sum_{i=1}^{N} x_i$$

where N is the number of samples, x the measured quantity and $\bar{x}$ its number average.

References on the calculation of the CoV can be found in U.S. Pat. Nos. 5,795,364 and 6,897,014.

The measured quantity x is the average of the grey shade (corresponding to the fraction of plastic material in the inert mixture at the exit), and is obtained by digitalising said micrographs. The digitalised images have a pixel resolution of about 5 micron and an area A of about 22 mm². The samples are obtained by dividing such area into a number N of regions of same area equal to $A_N = AN$ and by calculating the average value xi in each region.

For low N (tending towards 2), the CoV calculated is close to 0 as on large areas the effect of the poor dispersion of the dispersed material is attenuated, and if the distribution thereof is sufficiently good the average value of x of each area is similar. On the contrary, for N tending towards a large value, the area for the calculation of x is small, therefore the CoV is reduced. For images with only two levels of grey shades, it can be demonstrated that when the area is reduced to only one square pixel, the corresponding CoV is maximum and exclusively depends on the average concentration or the average of the shades, according to the following formula:

$$CoV_0 = \sqrt{\frac{1-\bar{x}}{\bar{x}}}$$

It is advantageous to represent the degree of mixing as the CoV ratio (see, for example, U.S. Pat. No. 5,597,236 or "Laminar Flow in Static Mixers with Helical Elements", A. Bakker, R. D. LaRoche, E. M. Marshall, The Online CFM Book, 1998):

$$H(N) = \frac{CoV(N)}{CoV_0}$$

so that H(N) is limited between 0 (complete homogeneity) and 1 (complete segregation), regardless of the quantity of recycled plastic material in the analysed sample.

In order to highlight the areas of recycled plastic material, the image is transformed into grey shades that range from 0 to 255.

The mixing diagram obtained by tracing H(N) as a function of the area of the regions $A_N(N)$ provides useful information on the morphology of the aggregates of recycled plastic material.

In particular, the value $A_C = A_N(N_C)$ of the area of the regions $A_N(N)$ for which $H(N_C) = \frac{2}{3}$ is obtained, is an indication of the degree of dispersion of the recycled plastic material. In fact, the taken samples that have an area greater than said value $A_C$ statistically have a variance in the content of recycled plastic material less than or equal to a fixed value. Below, the parameter $A_C = A_N(N_C)$ for which $H(N_C) = \frac{2}{3}$ is obtained, will be indicated with the term "minimal mixing area" (MMA).

Methodologically, the minimal mixing area is calculated through linear type interpolation of the data of the area of the regions $A_N(N)$ depicted on graphs as a function of H(N), as illustrated in FIGS. 4 and 5.

According to the teachings of the present disclosure, the minimal mixing area, measured on a sample of the composition produced, may preferably be less than or equal to 0.03 mm², more preferably between 0.001 mm² and 0.02 mm² even more preferably between 0.005 mm² and 0.015 mm².

To reach such degree of mixing, a person skilled in the art can perform the modifications to the mixing apparatus, or modify the process parameters thereof.

For example, if an extruder is used, the profile of the screw can be modified (for example by increasing the number of mixing elements), i.e. by acting on the process parameters (for example by reducing the temperature to promote an increase in viscosity and therefore mixing, or by increasing the screw rotation speed).

In a preferred embodiment, the final composition can be filtered.

In a preferred embodiment, the plastic material, the inerting agent and the hydrocarbon stream can be filtered. In a preferred embodiment both of the filtering operations previously described are present in the process described and claimed.

For that purpose, any system known in the state of the art for this purpose can be used, e.g. fixed or mobile filtering nets, and filter changer systems which possibly implement management modes that contemplate the filter change mode in line without interrupting operations, or continuous cleaning or at intervals or when the pressure loss exceeds a certain threshold value.

In an embodiment of the disclosure, during heating, any vapours that have formed are removed, in particular water vapour and light organic compounds.

In an embodiment of the disclosure, during heating there is no removal of any vapours formed.

In a preferred embodiment of the disclosure, there is no use of catalysts, in particular neither as a fixed component comprised in the apparatus, e.g. fixed to the walls of the apparatus, or as a component of the supplied composition. In fact, the invented process also operates in the absence of catalyst, and the catalytic processes are generally more complex to manage and more expensive.

In the case of using extruders, such removal can be performed by providing an opening in the barrel of the extruder, so that the vapours are removed from said opening, but not the composition treated which can be transported by the screw. The pressure at the opening point is selected so as to enable the removal of gases, i.e. it may be atmospheric, lower than atmospheric pressure, or even higher.

A further embodiment according to the present disclosure is a composition of plastic material mixed with hydrocarbons, oligomers derived from said plastic material, and halogenated salts that comprises:

plastic material free from halogenated components or with a halogen content less than or equal to 0.5% by mass with respect to the plastic material, oligomers derived from the plastic contained in said plastic material, halogenated salts, hydrocarbon.

wherein said composition can be obtained with a process capable of treating plastic materials, including recycled ones, containing halogenated components, which includes the following step:

heating and mixing at the same time or in separate stages, in one or more devices which include devices for heating and mixing, a plastic material, including a recycled one, containing halogenated components, an inerting agent and a hydrocarbon stream, thus forming a composition, bringing said composition at a temperature comprised between 150° C. and 450° C. and keeping the composition thus obtained within said temperature range for a time comprised between 10 seconds and 30 minutes, thus forming a final composition;

said process being characterized in that the inerting agent is added during the process in such an amount that the ratio between the sum of the moles of the alkali metals belonging to group IA and the sum of the moles of halogen contained in the plastic material is at most 20:1.

Also for this embodiment all the preferred and exemplified conditions are valid, and all the definitions described in the present text.

Once the final composition has been formed with the process described and claimed, said composition can be sent to refinery processes, optionally in the presence of an inerting agent as described in the present patent application, for enhancing hydrocarbon products, preferably selected from naphtha, atmospheric gas oil (AGO), light vacuum gas oil (LVGO) and heavy vacuum gas oil (HVGO).

Preferred refinery processes can be selected from one or more of the following technologies:

thermal or catalytic conversion processes; visbreaking processes;

coking processes;

cracking or hydrocracking processes;

catalytic and non-catalytic hydroconversion processes;

catalytic hydroconversion processes with Eni Slurry Technology (EST).

Even more preferred refinery processes are visbreaking, coking and catalytic hydroconversion processes. Even more preferably, the refinery process is the catalytic hydroconversion process.

The inerting agents optionally used in the refinery processes described in this text are selected in the group described and claimed in the present patent application. This means that the inerting agent in elementary form may be an alkali metal, belonging to group IA of the periodic table, period from 2 (lithium) to 6 (caesium), i.e. selected from lithium, sodium, potassium, rubidium caesium, more preferably a metal selected from lithium, sodium, potassium; even more preferably a metal selected from lithium or sodium; and related combinations. Among the combinations the preferred one is the combination of metallic lithium and sodium. More preferably, the inerting agent is metallic lithium. More preferably, the inerting agent is metallic sodium. More preferably, the inerting agent is a composition of sodium and lithium. In a preferred form the inerting agent is a sodium compound.

Among the sodium compounds carbonate, bicarbonate, carboxylates, biphenyl, cyclopentadiene, butyl, butyryl, oxide, hydroxide, alkyl sulfonates and alkylbenzene sulfonates are preferred. Among sodium carboxylate compounds, the preferred ones are stearates, palmitates, pivalates and octoates. Among the sodium stearates sodium 12-hydroxystearate is preferred. Among the lithium compounds, methyl, butyl, aspartate, acetate, carbonate, bicarbonate, stearate, oxide and hydroxide are preferred. Among the lithium stearates lithium 12-hydroxystearate is preferred. Anhydrifying inerting agents are preferred, i.e. materials that have the capacity to react with water, forming chemical species that no longer comprise water such as, for example, elementary lithium, elementary sodium, sodium biphenyl, sodium cyclopentadienyl. According to a preferred mode of the disclosure, the preferred sodium compounds are carbonates and carboxylates. Advantageously, the inerting agent can also comprise ketals, in particular 2,2-dimethoxypropane, up to 10% by weight with respect to the total weight of the inerting agent. Preferably in the refinery processes and its favourite the inerting agents may be different in terms of quantity and/or type with respect to those used in the previous step, i.e. in the process for treating plastic material according to the present patent application.

The refinery processes described in the present patent application preferably operate at a process temperature comprised between 350 and 700° C., preferably between 390 and 500° C., even more preferably between 400 and 480° C., even more preferably between 420 and 450° C.

The refinery processes described in the present patent application preferably operate at a pressure comprised between 2 and 1000 atm, preferably between 5 and 500 atm, even more preferably between 10 and 300 atm, even more preferably between 80 and 200 atm, where atm means the relative pressure in atmospheres.

The final composition may preferably be mixed with further vacuum residue. In that case, the ratio by weight between the final inert mixture and said vacuum residue is a value R comprised between 0.01 and 2, preferably between 0.03 and 1.5, even more preferably between 0.1 and 1.

The process for treating plastic material and the refinery processes described and claimed in the present patent application can be performed in different plants, or even in different production sites, even geographically separate.

In fact, the final composition described in the present patent application can be easily transported, even if it can solidify unless kept at temperature.

In this case, to feed the final composition it may be necessary to melt it. Any method known in the state of the art can be used for that purpose. For example, the final composition can be kept in agitation at 200° C. under mechanical agitation using a steel agitator with a two-blade propeller for 2 hours.

According to a preferred alternative mode, the process for treating plastic materials described and claimed in the present patent application is conducted inside the same plant in which the refinery processes described and claimed are conducted. In this case no intermediate operation is necessary. The final composition can be supplied directly to the refinery processes described and claimed, or pass into a buffer capacity so as to handle any plant upsets.

The Eni Slurry Technology process is a catalytic hydroconversion process that comprises the following steps:

Mixing a feedstock with a hydrocarbon, preferably a heavy distillate, more preferably a distillation residue, even more preferably a vacuum residue, possibly preheated, forming a reactant mixture;

feeding to the hydroconversion section the reactant mixture in slurry phase, a precursor of the catalyst containing Molybdenum, and a stream containing hydrogen and carrying out a hydroconversion reaction producing a reaction effluent;

separating the reaction effluent into at least one high-pressure and high-temperature separator in a vapour phase and a slurry phase;

then sending the separate vapour phase to a gas treatment section with the function of separating a liquid fraction from the gas containing hydrogen and hydrocarbon gases having from 1 to 4 carbon atoms; said liquid fraction comprising naphtha, atmospheric gas oil (AGO), vacuum gas oil (VGO);

Subsequently sending the slurry layer to a separation section which has the function of separating the Vacuum Gas Oil (VGO), Heavy Vacuum Gas Oil (HVGO), Light Vacuum Gas Oil (LVGO), Atmospheric Gas Oil (AGO), from a stream of heavy organic products which contains asphaltenes, unconverted feed, catalyst and solid formed during the hydro-conversion reaction;

Recirculating a part of said heavy organic products to the hydroconversion section, or mixing them with the load before being supplied to the hydroconversion, and with the remaining ones forming a purge stream.

Preferably, the feedstock in the Eni Slurry Conversion process is the final composition obtained with the process for treating plastic materials described and claimed in the present patent application.

In said process, the catalytic hydroconversion reaction and the separation of the reaction effluents at high pressure and temperature take place in a temperature range comprised between 420° C. and 440° C., at a pressure comprised between 155 atm and 160 atm.

The hydroconversion process of the final inert mixtures has an efficiency considered as the fraction by mass of light distillates produced with respect to the mass of plastic material and vacuum residue supplied in the plastic material treatment process, equal to at least 5%, preferably from 10 to 70%, even more preferably from 20 to 50%.

Surprisingly it has been discovered that if the ratio between plastic material and vacuum residue supplied in total is at least 0.1, the yield of light distillates as defined above is higher, i.e. equal to at least 15%, even more preferably from 20 to 80%.

Some examples are given below for a better understanding of the disclosure and of the scope of application despite they do not constitute in any way a limitation of the scope of the present disclosure.

Comparative Example 1

The process for treating recycled plastic material is performed by grinding recycled plastic material, whose composition comprises about 65% polyolefin, 5% polyamide, 14% high impact polystyrene, 6% polyethylenterephtalate, 2% polyvinyl chloride, plus other materials in a lower quantity, as follows: the recycled plastic material, in the form of thin films with an average size of 3 cm×3 cm, is supplied to a Retsch ZM200 rotor ultracentrifugal mill with annular screens, with 1300 W current absorption and rotation speed between 6000 and 18000 rpm.

The total chlorine content is about 1.14% by weight of chlorine with respect to the total weight of plastic material.

The recycled plastic material is subjected to cryogenic grinding using the following running conditions:

Material dosing through the Retsch DR100 sampler with slide speed 5

RPM=10000 grinding time=60 minutes per 15-20 grams of product 0.12 mm annular screen

Addition of dry ice in the rotor for cooling to prevent any packing of the material during grinding Aspirated cyclone collection tank The cryogenic grinding of the recycled plastic material produces a particle size distribution characterised by $D_{50} \leq 0.2$ mm.

10 g of recycled plastic material that has been cryogenically ground, at room temperature, are taken and added to 90 g of vacuum residue pre-heated to 200° C. The mixture is kept heated at 200° C. for 2 h under mechanical agitation at 60 rpm in a 500 ml beaker provided with a steel mechanical agitator with a two-blade propeller.

Examples According to the Disclosure from 2 to 5

Figure 1:
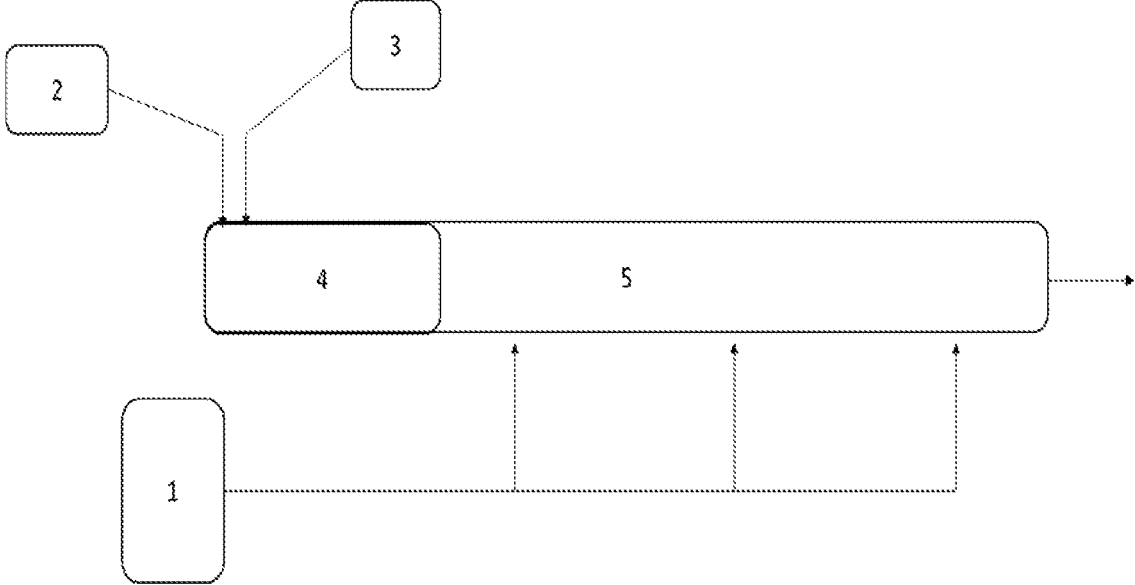
FIG. 1 illustrates a preferred embodiment of the present disclosure, in particular, the process is performed through extrusion in a device that comprises section (4) and section (5).

The process for treating recycled plastic material is performed by feeding to a twin screw co-rotating extruder described in FIG. 1 the following components.

The first component is the recycled plastic material, whose composition comprises about 65% polyolefin, 5% polyamide, 14% high impact polystyrene, 6% polyethylenterephtalate, 2% polyvinyl chloride, plus other materials in smaller amounts.

The recycled plastic material contains 1.14% chlorine, calculated as weight of chlorine (as an atom) with respect to the total weight of the recycled plastic material.

The recycled plastic material contains 2% calcium, calculated as weight of calcium (as an atom) with respect to the total weight of the recycled plastic material.

The recycled plastic material is selected to remove inert material such as stones and large metallic materials, thickened in the form of pellets having a length of about 2 cm and diameter of 5 mm, then supplied to the extruder hopper through a weight loss feeder, with flow control.

The second component is light sodium carbonate by Brenntag having $D_{50}$ equal to 0.063 mm. The sodium carbonate is supplied to the same extruder hopper as powder through a weight loss feeder, also with flow control.

The third component is the vacuum residue of industrial origin as characterised in Table 1.

TABLE 1

| Properties | Unit of measurement | Value | Method used |
|---|---|---|---|
| Density at 15° C. | kg/m3 | 1004 | ASTM-D1298 |
| S (sulphur) | % by weight | 4.33 | ASTM-D1552 |
| CCR | % by weight | 18.5 | D-4530 ASTM |

TABLE 1-continued

| Properties | Unit of measurement | Value | Method used |
|---|---|---|---|
| Asphaltenes | % by weight | 14.6 | ASTM 6560 |
| Aromatic | % by weight | 29.2 | D2007 ASTM |
| 500° C.- | % by weight | 15 | ASTM 7169 |
| 530° C.- | % by weight | 23 | ASTM 7169 |

Where:

"S" is the sulphur content

"CCR" is the Conradson Carbon Residue

"500° C.-" is the percentage of material with boiling point lower than 500° C.

"530° C.-" is the percentage of material with boiling point lower than 530° C.

The twin screw co-rotating extruder is appropriately equipped to enable both the feeding of solids and liquids.

With reference to FIG. 1, (1) represents the vacuum residue feeding system. This is melted in a tank heated to the temperature of 160° C. placed on a scale and supplied to the extruder through a volumetric pump. The flow rate is regulated by varying the speed and stroke of the pump, based on the weight loss of the scale. The flow of vacuum residue is injected into the extruder splitting the total flow rate into three streams and then injecting the total flow rate in three different points of the extruder, all downstream of the melting, dehalogenation and inertisation section of the polymer mixture. The flow rate in each of the injection points is regulated through the partialisation of a manual valve placed on the feed line of each of the three streams, to guarantee the same upstream pressure at each injection point (and therefore a similar flow rate).

(2) shows the feeding system of the recycled plastic material to the hopper of the twin screw co-rotating extruder. The feeding of the recycled plastic material takes place through a weight loss feeder, with flow control.

(3) shows the feeding system of inerting additives to the hopper of the twin screw co-rotating extruder. The feeding of the inerting additives takes place through a weight loss feeder, with flow control.

The twin screw co-rotating extruder used for the melting, dehalogenation, inertisation and mixing of the Examples of the disclosure is characterised by a screw diameter D=30 mm and a characteristic length defined by a ratio L/D=76. The rotation speed of the screws is set to 900 rpm. The extruder is heated using resistances placed in the barrel and cooled with a water circuit. Each section of the barrel has independent control therefore the temperature can be set as preferred and regulated in feedback.

The extruder is composed of a first section represented in (4) in FIG. 1 dedicated to: melting, dehalogenation and stabilisation, in the downstream processes, of the halogenated compounds.

Both the recycled plastic material and the inerting additives are fed to this first section, through the dedicated feed hopper.

The first section of the extruder has a characteristic length of 24 diameters and is operated according to the following barrel temperature profile split into three distinct zones:

in the first zone, dedicated to the transport of recycled plastic at the inlet (characteristic length of 4 diameters) the temperature is set to 50° C.

in the second zone, dedicated to the melting of recycled plastic (characteristic length of 4 diameters) the temperature is set to 250° C.

in the third zone, dedicated to the dehalogenation and inertisation of recycled plastic (characteristic length of 16 diameters) the temperature is set to 390° C.

The third zone of the first section of the extruder is provided with a degassing zone for removing the gases generated, mainly carbon dioxide ($CO_2$) and water vapour ($H_2O$), operated at the pressure of 0.2 bara through a dedicated vacuum pump.

The second section of the extruder represented (5) in FIG. 1 is dedicated to the intimate mixing of the stream leaving the first section. Such second section has a characteristic length of 52 diameters and is operated according to the following modes.

Downstream of the first section of the extruder, after a length of 8 diameters, the first aliquot of vacuum residue is injected; the temperature of the barrel is set to 240° C. Straight after the inlet of the vacuum residue, the screw is equipped with mixing elements for a length of 8 diameters. This is followed by transport elements for a length of 4 diameters; then straight after, the second aliquot of vacuum residue is injected. The temperature of the barrel is set to 220° C. Straight after the inlet of the second aliquot of vacuum residue, the screw is equipped with mixing elements for a length of 12 diameters. This is followed by transport elements for a length of 4 diameters. Then the third aliquot of vacuum residue is injected. The temperature of the barrel is set to 180° C. Straight after the inlet of the third aliquot of vacuum residue, the screw is equipped with mixing elements for a length of 12 diameters.

The last 4 diameters of the section are dedicated to the cooling of the mixture and are operated by setting the barrel temperature to 160° C.

The extruder is managed with starve feed, i.e. the speed (screw revolutions) of the extruder is regulated so that its flow rate is greater than the flow rate from the feed hopper. In this way there is no accumulation of material in the hopper, and therefore poor control of the uniformity of the feeding.

Various tests have been performed, varying the ratio between the streams supplied (recycled plastic material, sodium carbonate and vacuum residue). The compositions tested and the process conditions used are summarised in Table 2.

TABLE 2

| | EXAMPLE 2 | EXAMPLE 3 | EXAMPLE 4 | EXAMPLE 5 |
|---|---|---|---|---|
| Recycled plastic material | 9.7% w/w | 19.4% w/w | 29.1% w/w | 19.5% w/w |
| Sodium carbonate | 0.3% w/w | 0.6% w/w | 0.9% w/w | 0.5% w/w |
| Vacuum residue | 90.0% w/w | 80% w/w | 70.0% w/w | 80.00% w/w |
| Flow rate kg/h | 60 | 60 | 60 | 60 |
| Mass ratio sodium/ plastic material | 1.5% | 1.5% | 1.5% | 1.1% |
| Na/Cl (mol/mol) | 2 | 2 | 2 | 1.5 |

In the examples from 2 to 4 there is a molar ratio of Na/Cl equal to about 2 whereas in example 5 there is a molar ratio of Na/Cl equal to about 1.5. Said Na/Cl molar ratio relates to the ratio between the moles of sodium contained in the inerting agent with respect to the moles of chlorine contained in the plastic material.

In examples 2 to 4 there is a feeding of sodium/plastic material in ratio by mass of about 1.5% whereas in example there is a feeding of sodium/plastic material in ratio by mass of about 1.1%. Said sodium/plastic material ratio by mass refers to the ratio between the mass of sodium contained in the inerting agent with respect to the mass of the plastic material.

The product of examples 2 to 5 was sampled twice at the exit of the extruder.

In said samples the only halogen detected was chlorine. In the first sample chlorine was determined by means of ion chromatography after mineralisation of the sample via calorimetric bomb.

The second sample was treated at 550° C. for 4 hours in an inert atmosphere (nitrogen) at atmospheric pressure. In this second sample thus treated the chlorine was determined by means of ion chromatography after mineralisation of the sample treated by calorimetric bomb.

The difference in quantity of chlorine between the first and the second sample was evaluated. Said difference is attributed to the organic chlorine and therefore for the purpose of the present disclosure it is defined as the quantity of organic chlorine.

Therefore, the ratio between said quantity of organic chlorine and the quantity of plastic material supplied, by mass, is calculated.

For all four Examples 2, 3, 4 and 5, said ratio was less than 2000 ppm (0.2%).

The product of examples 2 to 5, at the exit of the extruder was supplied to a stirred autoclave to conduct a hydroconversion of the composition obtained at the exit of the extruder.

A solution of molybdenum 2-ethylhexanoate is added in the autoclave in such an amount as to have about 3000 wppm of molybdenum by weight (mass) with respect to the total mass of the product obtained at the of the extruder.

The autoclave is then pressurised and heated following various pressurisation and heating steps. In particular, in these examples, compressed hydrogen was first injected up to 90 barg and then the autoclave was heated to 160° C. In the second step the pressure is increased to 120 barg by injecting hydrogen, and heated to 430° C. Finally, the pressure is brought to 160 barg, again through compressed hydrogen injection.

4 hours after reaching the desired temperature (430° C.) the autoclave is cooled to 250° C. and completely depressurised, the head vapours are extracted and condensed in a cold trap at 0° C. (analysed via ASTM D2887). The non-condensable gases are instead collected in a gas sampler (analysed via ASTM D7833). Once the light products have been extracted, the autoclave is cooled to room temperature. Finally, the residual material contained in the autoclave is extracted. The residue contained in the autoclave is treated with tetrahydrofuran (THF) so as to obtain a 2% solution by mass of residue with respect to THF. This addition determines the precipitation of material that is insoluble in THF such as, for example, metal sulphides, or carbon material that was produced during the test. Therefore, the part that is insoluble in tetrahydrofuran is filtered, dried and weighed. From the fraction that is soluble in tetrahydrofuran the THF is evaporated and the sample is analysed through ASTM D6352.

The reaction products are quantified and characterised, as shown in Table 3.

The yields are calculated as mass of each of said fractions (head gas, light distillate, heavy distillate, bottom) with respect to the mass at obtained the exit of the extruder and initially loaded.

The gaseous products were detected and measured by ASTM D7833 Standard Refinery Gas Analysis and contents from 1 to 4 carbon atoms (gases) are produced, defined as GASES.

The light distillates are defined as gaseous products containing more than 5 carbon atoms detected by ASTM D7833 Standard Refinery Gas Analysis and the liquid products whose boiling point range measured by ASTM D2887 and by ASTM 6352 is comprised between 36° C. and 170° C. Heavy distillates are defined as liquid products whose boiling point range measured by ASTM D2887 and by ASTM D6352 is comprised between 170° C. and 500° C. The bottom is determined by the other products, i.e. the liquid products with boiling point over 500° C. (500+° C.), or of a solid nature (insoluble in THF).

TABLE 3

| Product yields | | EXAM-PLE 2 | EXAM-PLE 3 | EXAM-PLE 4 | EXAM-PLE 5 |
|---|---|---|---|---|---|
| GAS | wt/wt$_{FEED}$ | 10% | 11% | 13% | 11% |
| Light distillates | wt/wt$_{FEED}$ | 14% | 17% | 19% | 17% |
| Heavy distillates | wt/wt$_{FEED}$ | 52% | 47% | 43% | 47% |
| Bottom | wt/wt$_{FEED}$ | 25% | 25% | 25% | 25% |

Comparative Examples 6 and 7

The comparative examples 6 and 7 were performed with the same operating methods as the inventive examples 2-5 varying the concentration of inerting agent: 0% for comparative example 6, and 0.1% for comparative example 7, where the percentages are expressed with respect to the total supplied to the extruder, while the concentration of vacuum residue is maintained at 80% with respect to the total supplied to the extruder.

The compositions tested and the process conditions used are summarised in Table 4.

TABLE 4

| | EXAMPLE 6 | EXAMPLE 7 |
|---|---|---|
| Recycled plastic material | 20.0% w/w | 19.9% w/w |
| Sodium carbonate | 0% w/w | 0.1% w/w |
| Vacuum residue | 80.0% w/w | 80.0% w/w |
| Flow rate | 60 kg/h | 60 kg/h |
| Mass ratio sodium/plastic material | 0% | 0.2% |
| Na/Cl (mol/mol) | 0 | 0.3 |

In example 7 a molar ratio Na/Cl of about 0.3 is supplied. In example 7 a ratio by mass of sodium/plastic material equal to about 0.2% is supplied.

The product of examples 6 to 7, at the outlet from the extruder, was supplied to a stirred autoclave to conduct a hydroconversion of the vacuum residue.

The tests were conducted in the same way as the previous tests from 2 to 5 and the results are shown in Table 5.

TABLE 5

| Product yields | | EXAMPLE 6 | EXAMPLE 7 |
|---|---|---|---|
| GAS | wt/wt$_{FEED}$ | 12% | 11% |
| Light distillates | wt/wt$_{FEED}$ | 17% | 17% |
| Heavy distillates | wt/wt$_{FEED}$ | 47% | 47% |
| Bottom | wt/wt$_{FEED}$ | 24% | 25% |

Comparative Example 8

The inventive example 3 is repeated by feeding, through the feed hopper of inerting agent (2) of FIG. 1, a master batch of commercial calcium carbonate based on polyethylene "POLYBATCH LCC 70" produced by "A. Schulman". The master contains 70% by weight of calcium carbonate.

The composition tested and the process conditions used are summarised in Table 6.

TABLE 6

| | EXAMPLE 8 |
|---|---|
| Recycled plastic material | 19.3% w/w |
| Calcium carbonate master | 0.7% w/w |
| Vacuum residue | 80.00% w/w |
| Flow rate | 60 kg/h |
| Mass ratio calcium/ plastic material | 1.0% |
| Ca/(2Cl) (mol/mol) | 1.5 |

The tests in the autoclave with a hydroconversion reaction were conducted in the same way as the previous tests 2-5 and the results are shown in Table 7.

TABLE 7

| Product yields | | EXAMPLE 8 |
|---|---|---|
| GAS | wt/wt$_{FEED}$ | 11% |
| Light distillates | wt/wt$_{FEED}$ | 17% |
| Heavy distillates | wt/wt$_{FEED}$ | 47% |
| Bottom | wt/wt$_{FEED}$ | 25% |

Examples According to the Disclosure 9, 10, 11

The inventive example 3 was repeated feeding to the twin-screw co-rotating extruder described in FIG. 1 the recycled plastic material having the composition shown in Table 8.

TABLE 8

| | | Example 9 | Example 10 | Example 11 |
|---|---|---|---|---|
| polyethylene | % w/w | 44 | 63 | 13 |
| polypropylene | % w/w | 24 | 24 | 54 |
| polystyrene | % w/w | 15 | 0 | 16 |
| polyethylenterephtalate | % w/w | 6 | 0 | 5 |
| polyamide | % w/w | 5 | 0 | 0 |
| polyvinyl chloride | % w/w | 2 | 2 | 2 |

The results of the hydroconversion reaction in the autoclave are shown in Table 9.

TABLE 9

| | | Example 9 | Example 10 | Example 11 |
|---|---|---|---|---|
| GAS | wt/wt$_{FEED}$ | 10% | 10% | 10% |
| Light distillates | wt/wt$_{FEED}$ | 20% | 16% | 21% |
| Heavy distillates | wt/wt$_{FEED}$ | 43% | 50% | 50% |
| Bottom | wt/wt$_{FEED}$ | 27% | 24% | 19% |

Example According to the Disclosure 12

Example 3 was repeated feeding to the twin screw co-rotating extruder described in FIG. 1 the following components:

Recycled plastic material, whose composition comprises about 42% polyethylene, 21% polypropylene, 2% polyamide, 10% high impact polystyrene (HIPS), 6% polyethylenterephtalate, 10% polyvinyl chloride plus other materials in lower amounts. The recycled plastic material is selected to remove inert material such as stones and large metallic materials, thickened in the form of pellets having a length of about 2 cm and diameter of 5 mm, then supplied to the extruder hopper through a weight loss feeder, with flow control.

"Light Sodium Carbonate" sodium carbonate by Brenntag having d50 equal to 0.063 mm. The sodium carbonate is supplied to the same extruder hopper as powder through a weight loss feeder, also with flow control.

The mixture tested (percentages calculated with respect to the total weight of the material supplied to the extruder) and the flow rate are summarised in Table 10.

TABLE 10

| | EXAMPLE 12 |
|---|---|
| Recycled plastic material | 17.7% w/w |
| Sodium carbonate | 2.2% w/w |
| Vacuum residue | 80.00% w/w |
| Flow rate | 60 kg/h |
| Mass ratio sodium/plastic material | 5.5% |
| Na/Cl (mol/mol) | 1.5 |

In example 12 a molar ratio Na/Cl of about 1.5 is supplied. In example 12 a ratio by mass of sodium/plastic material equal to about 5.5% is supplied.

The results of the hydroconversion reaction in the autoclave are shown in Table 11.

TABLE 11

| | | Example 12 |
|---|---|---|
| GAS | wt/wt$_{FEED}$ | 9% |
| Light distillates | wt/wt$_{FEED}$ | 16% |
| Heavy distillates | wt/wt$_{FEED}$ | 49% |
| Bottom | wt/wt$_{FEED}$ | 26% |

Analysis of the Chlorine Content in the Comparative Examples and According to the Disclosure 2-8 and 12

Tables 12 and 13 show the chlorine content, meaning parts by weight of chlorine (as an atom) with respect to the total weight of the analysed fraction, in the various fractions of the Examples and Comparative examples 2-8 and 12.

It has been considered that in the gaseous phase the chlorine was only present as hydrogen chloride (HCl). The hydrogen chloride in the gaseous phase was determined with Draeger tube.

The chlorine in the light distillate was determined with the method indicated in D4929. The chlorine in the heavy distillate was determined with the method indicated in D7536.

The chlorine in the bottom was determined by means of argentometric titration after mineralisation of the sample of the bottom by calorimetric bomb.

TABLE 12 total chlorine analysis

| | Example 2 | Example 3 | Example 4 | Example 5 | Example 12 |
|---|---|---|---|---|---|
| GAS ppm | <1 | <1 | <1 | <1 | <1 |
| Light distillates ppm | <5 | <5 | <5 | <5 | <5 |
| Heavy distillates ppm | <5 | <5 | <5 | <5 | <5 |
| Bottom % wt/wt | >0.4 | >0.8 | >1.2 | >0.8 | >3.9 |

TABLE 13 total chlorine analysis

| | Comp. Example 6 | Comp. Example 7 | Comp. Example 8 |
|---|---|---|---|
| GAS ppm | >5000 | >5000 | >5000 |
| Light distillates ppm | 25 | 17 | 25 |
| Heavy distillates ppm | 48 | 33 | 49 |
| Bottom % | 0.44 | 0.59 | 0.45 |

Comments on the Experimental Results

Despite the inerting stream and that of the recycled plastic material being supplied separately, surprisingly the inerting agent supplied was available. In fact, also with doses that are little more than stoichiometric (Example 5 and Example 12: ratio Na:Cl=1.5) the inerting agent prevented chlorine being released into the gases and into the distillates.

This is even more surprising, as the calcium is already present and intimately dispersed into the polymer matrix. In fact, calcium salts typically have a dimension of no more than 1 micron and are intimately mixed in extrusion with the plastic material during the production thereof; instead the sodium salt used in the example has a particle size of about 100 micron and is not yet present in the plastic material rather it is added during the treatment process.

In the inventive example 2, inventive example 3 and inventive example 4 (with variable concentrations of vacuum residue of 90, 80 and 70%) the stream at the outlet of the extruder was supplied to the autoclave for the hydro-conversion reaction. The streams of light hydrocarbons and that of the gases at the outlet of the plant had a chlorine concentration of <5 ppm. This demonstrates the efficacy of the process upon the variation of the concentration of recycled plastic material.

This was also verified in the streams at the outlet of the plant exercised according to the description of example 5, although in this case the quantity of inerting agent added to the extruder was lower than that used for the preparation of the mixtures used for the previous examples 2, 3 and 4. In particular, in examples 2, 3 and 4 the addition of inerting agent was operated in order to maintain a stoichiometric ratio Na/Cl equal to 2 contrary to the inventive example 5 in which the inerting agent was operated so that such ratio was equal to about 1.5.

The result of Example 12 is particularly surprising. In fact, in this case the quantity of chlorine supplied was very high—about 5.7% with respect to the weight of the recycled plastic material. Despite this, and despite the Na/Cl ratio being about 1.5, no presence of chlorine in the liquid effluents (the distillates) and gaseous effluents was recorded.

On the contrary, in the comparative Example 6 in the gaseous streams and streams of light hydrocarbons at the outlet from the plant the presence of chlorine was detected. In this example, no inerting agent was added. This com-parative example also shows a particularly important aspect of the present disclosure: calcium, which was actually in excess with respect to chlorine, and clearly in intimate contact with the recycled plastic material, was not as effec-tive.

The presence of chlorine in the gas and in the light distillate was also found in Example 7. In this case the feeding of sodium-based inerting agent was regulated so as to dose the inerting agent in a lower amount with respect to the stoichiometric ratio 1:1 of sodium, present in the inerting agent, with respect to the chlorine contained in the recycled plastic material entering the extruder.

The presence of chlorine was also detected in the gaseous effluent and in the light distillate of comparative example 8. In this case the preparation step was operated so as to replace the inerting agent sodium calcium carbonate with an equal quantity (in stoichiometric terms of calcium ions for making CaCl$_2$) with respect to sodium ions for making NaCl) of calcium carbonate master.

This shows that even if the calcium is supplied as inerting agent according to the mode of the disclosure, it is surpris-ingly not effective.

Also, a comparative analysis of the sulphur content in the bottom of the inventive example 5 highlighted a signifi-cantly lower presence with respect to the sulphur content in the bottom of comparative example 8. Therefore, it is surprisingly deduced that calcium fixes sulphur more than sodium does.

It has been observed that in the presence of a salt of an alkaline earth metal, in particular calcium, but in the absence of a salt of an alkali metal such as sodium (e.g. Comparative Example 8) the bottom contains sulphide of said alkaline earth metals, in particular calcium sulphide.

The presence of calcium sulphide is disadvantageous because:

a) at the outlet of the autoclave the sulphur is mainly contained in the form of hydrogen sulphide ($H_2S$); hydrogen sulphide is a useful gas in different refinery processes (e.g. catalytic hydroconversion according to the already mentioned WO 2008/141830) and therefore its consumption is undesirable.

b) sulphur salts such as calcium sulphide are generally toxic and harmful and give the material in which they are contained (e.g. the bottom) an unpleasant characteristic smell.

The applicant observed that if instead an alkaline inerting agent is used such as sodium, also in the presence of an alkaline earth element such as calcium, surprisingly the bottom from the autoclave has a lower sulphur content.

Not claiming to provide a demonstration, it can be hypothesised that the alkali metal in the inerting agent, which has not reacted with the hydrogen halide (e.g. hydrogen chloride, HCl), is able to react with the sulphur, forming the corresponding sulphide (e.g. $Na_2S$), or is able to prevent the formation of the alkaline earth metal salt (e.g. CaS). The alkali metal sulphide (e.g. $Na_2S$) in the conditions indicated for the present disclosure probably reacts with the hydrogen halide (e.g. HCl) forming alkali metal halide (e.g. NaCl) and hydrogen sulphide ($H_2S$). Alternatively, the alkali metal in the inerting agent and that has not already reacted with the hydrogen halide (e.g. Na2CO3), is able to react with the sulphur present as alkaline earth metal sulphide (e.g. CaS and organic sulphur) and the hydrogen halide, forming the alkali metal halide (NaCl), hydrogen sulphide ($H_2S$). Furthermore, the alkali metal sulphide (such as $Na_2S$) is generally an effective nucleophile and therefore has the further advantage of enabling the dechlorination of alkyl and aromatic chlorides that can form by reaction of the hydrochloric acid generated during the process with olefins and/or aromatic compounds already present in the vacuum residue, forming sodium chloride and contributing to reducing the formation of chlorinated products in the distillates and in the reaction gases of the hydro-treatment.

It is not desirable to have a high sulphur content in the solid residue: as well as disposal problems, an increase in solids produced is undesirable because it reduces the yield of valuable products such as the distillates. Vice versa, it is desirable for the sulphur to remain available as hydrogen sulphide (which is useful in the refinery for performing different treatments).

Examples 9, 10 and 11 show that the process identified in the present disclosure also works for very wide variations of the polymer composition of the recycled plastic material.

Furthermore, the variations in the yields of light distillates are very limited compared to the wide variation of the composition. For example, between Example 11 and Example 10, the polyethylene drops from 63% to 13%, i.e. a reduction of almost 5 times, whereas the variation of the yield of light distillates is only 4% (from 18 to 24%).

FIGS. 2 and 3 show the micrographs of Comparative Example 1 and Inventive Example 3, respectively. The zones that appear light in the image correspond to local enrichments of recycled plastic material, the zones that appear dark correspond to RV enrichment zones. The visual evaluation of the images supports the statement that the mixture prepared according to the methodology described in the disclosure (FIG. 2) is characterised by intimate mixing between recycled plastic material and vacuum residue. Differently, FIG. 3 acquired on a sample made according to the method of comparative example 1 shows a worse degree of mixing. This is confirmed by the quantitative evaluation that was performed with the methodology indicated for the calculation of the minimal mixing area. From a quantity point of view, the non-uniform distribution of recycled plastic material in the vacuum residue prepared according to example 1, is confirmed by the value of the minimal mixing area that does not reach the values obtained by the mixture compared according to the method described in the disclosure. In fact, for H=⅔ (=ca. 0.67) the mixing area for comparative example 1 (i.e. the minimal mixing area) is about 0.032 square millimetres (see FIG. 4). Instead, the mixing area for example 3, still evaluated for H=⅔, is only 0.0095 square millimetres (see FIG. 5).

The invention claimed is:

1. A composition of plastic material which comprises:
   plastic material with a halogen content less than or equal to 0.5% by mass with respect to the plastic material,
   oligomers derived from the plastic contained in said plastic material, said oligomers being generated from the thermal degradation of said plastic material,
   halogenated salts, and
   hydrocarbons.

2. The composition according to claim 1, wherein the hydrocarbons are selected from heavy distillates.

3. The composition according to claim 1, wherein the hydrocarbon is vacuum residue.

4. The composition according to claim 1, wherein the halogenated salts are selected from alkali metal salts of group IA.

5. The composition according to claim 4, wherein the halogenated salts are selected from the group consisting of chlorides of alkali metals of group IA, fluorides of alkali metals of group IA, bromides of alkali metals of group IA, and iodides of alkali metals of group IA.

6. The composition according to claim 5, wherein the chlorides of the alkali metals of group IA are selected from the group consisting of lithium chloride, sodium chloride, and potassium chloride.

7. The composition according to claim 5, wherein the bromides of the alkali metals of group IA are selected from the group consisting of lithium bromide, sodium bromide, and potassium bromide.

8. The composition according to claim 1, wherein the minimal mixing area of the composition produced is less than or equal to 0.03 $mm^2$.

9. The composition according to claim 8, wherein the minimal mixing area varies between 0.001 $mm^2$ and 0.02 $mm^2$.

10. A process for producing a composition of plastic material includes the following steps:
    forming a composition by heating and mixing at the same time or in separate stages, in one or more devices which include devices for heating and mixing, a plastic material, including a recycled one, containing halogenated components, an inerting agent and a hydrocarbon stream,
    bringing said composition at a temperature comprised between 150° C. and 450° C., and
    keeping the composition thus obtained within said temperature range for a time comprised between 10 seconds and 30 minutes, thus forming a final composition;
    wherein the inerting agent is added during the process in such an amount that the ratio between the sum of the moles of the alkali metals belonging to group IA and the sum of the moles of halogen contained in the plastic material is at most 20:1.

11. The process according to claim 10, wherein the plastic material contains organic or inorganic compounds.

12. The process according to claim 11, wherein the organic and inorganic compounds are selected from the group consisting of metallic materials, ceramic materials, building materials; insulation materials; paper and cardboard; food residues; and soil materials.

13. The process according to claim 10, wherein the plastic material comprises plastics for at least 60% by weight, said % calculated with respect to the overall weight of the plastic material.

14. The process according to claim 13, wherein the plastic material comprises plastics for at least 80% by weight, said % calculated with respect to the overall weight of the plastic material.

15. The process according to claim 14, wherein the plastic material comprises plastics for 100% by weight, said % calculated with respect to the overall weight of the plastic material.

16. The process according to claim 10, wherein said plastic material is PLASMIX.

17. The process according to claim 10, wherein the plastic material is in the form of flakes and has a median size ($D_{50}$) greater than 0.2 cm; or wherein the plastic material is compacted in the form of pellets obtained by extrusion of the flakes through a die plate with holes of diameter from 2 to 20 mm.

18. The process according to claim 17, wherein the plastic material in the form of flakes is characterized by an apparent density greater than 50 kg/m$^3$ measured according to ASTM D1895-17 method C, "before loading" density measurement.

19. The process according to claim 17, wherein the plastic material in the form of pellets is characterized by an apparent density greater than 200 kg/m$^3$ measured according to ASTM D1895-17 method B.

20. The process according to claim 10, wherein the composition of the plastics contained in said plastic material comprises at least one of the following components selected from the group consisting of, where the percentages are expressed by weight with respect to the total of the plastics:

Polyethylene: 10-100%
Polypropylene: 0-50%
Polystyrene: 0-50%
Polyesters: 0-20%
The sum of cellulosic, urethane and polyamide polymers: 0-20%
Inorganic fillers: 0-30% and
Chlorinated polymers in amounts such that the weight of chlorine is comprised between 0.05 and 15% with respect to the total weight of the plastic materials.

21. The process according to claim 10, wherein the ratio between the sum of the moles of the alkali metals belonging to group IA and the sum of the moles of halogen contained in the plastic material varies between 10:1 and 1:1.

22. The process according to claim 21, wherein the ratio between the sum of the moles of the alkali metals belonging to group IA and the sum of the moles of halogen contained in the plastic material varies between 3:1 to 3:2.

23. The process according to claim 10, wherein the inerting agent is added in such an amount that simultaneously:

the ratio between the sum of the moles of alkali metals belonging to group IA and the sum of the moles of halogen contained in the plastic material is at most 20:1 and the ratio between the mass of alkali metals belonging to group IA and the mass of plastic material is at least 1:1000.

24. The process according to claim 10, wherein the inerting agent is an alkali metal belonging to group IA of the periodic table, selected from the group consisting of lithium, sodium, potassium, rubidium, caesium, and combinations thereof.

25. The process of claim 24, wherein the metal is a mixture of lithium and metallic sodium.

26. The process according to claim 10, wherein the inerting agent is a sodium compound selected from the group consisting of carbonate, bicarbonate, carboxylates, biphenyl, cyclopentadienyl, butyl, butyral, oxide, hydroxide, alkyl sulfonates, and alkylbenzene sulfonates.

27. The process according to claim 26, wherein the sodium carboxylate compounds are selected from the group consisting of stearates, palmitates, pivalates, and octoates.

28. The process according to claim 10, wherein the inerting agent is a lithium compound selected from the group consisting of methyl, butyl, aspartate, acetate, carbonate, bicarbonate, stearates, oxide, and hydroxide.

29. The process according to claim 10, wherein the inerting agent also comprises ketals up to 10% by weight with respect to the total weight of the inerting agent.

30. The process according to claim 10, wherein the hydrocarbon stream is the vacuum residue.

31. The process according to claim 10, which is conducted by extrusion.

32. The process according to claim 10, which is conducted in a two-stage mode which comprises:

a first stage in which the plastic material and inerting agent are mixed to form a first composition; then a second stage in which said first composition is mixed with a hydrocarbon stream forming a final composition of plastic material.

33. The process according to claim 32, wherein the plastic material is preheated to a temperature of at least 150° C.

34. The process according to claim 32, wherein the apparatuses are extruders.

35. The process according to claim 10, which is conducted in one or more apparatuses selected from the group consisting of extruders, static mixers, dynamic mixers, and stirred reactors.

36. The process according to claim 10, wherein the minimal mixing area measured on the final composition of plastic material is less than or equal to 0.03 mm$^2$.

37. The process according to claim 10, which further comprises the step of converting by thermal or catalytic conversion processes, optionally in the presence of inerting agents, said final compositions of plastic material into hydrocarbon products.

38. The process according to claim 10, which further comprises the step of converting by visbreaking processes, optionally in the presence of inerting agents, said final compositions of plastic material into hydrocarbon products.

39. The process according to claim 10, which further comprises the step of converting said final compositions of plastic material by cracking or hydrocracking processes optionally in the presence of inerting agents into hydrocarbon products.

40. The process according to claim 10, which further comprises the step of converting said final compositions of plastic material by catalytic and non-catalytic hydroconversion processes, optionally in the presence of inerting agents, into hydrocarbon products.

41. The process according to claim 10, which further comprises the step of converting said final compositions of plastic material into hydrocarbon products by catalytic hydroconversion processes with Eni Slurry Technology (EST), optionally in the presence of inerting agents.

42. The process according to claim 10, wherein the hydrocarbon products are selected from the group consisting of light distillates, heavy distillates, and gases.

43. The process according to claim 42, wherein the hydrocarbon products are selected from the group consisting of naphtha, atmospheric gas oil (AGO), light vacuum gas oil (LGVO) and heavy gas oil (HVGO).

* * * * *